(12) United States Patent
Du et al.

(10) Patent No.: US 8,493,245 B2
(45) Date of Patent: Jul. 23, 2013

(54) DETERMINATION OF LONG BINARY SEQUENCES HAVING LOW AUTOCORRELATION FUNCTIONS

(75) Inventors: Ke Lin Du, Verdun (CA); Wei Hsiang Wu, Hong Kong (CN); Wai Ho Mow, Hong Kong (CN)

(73) Assignee: Dynamic Invention LLC, Mahe (SC)

( * ) Notice: Subject to any disclaimer, the term of this patent is extended or adjusted under 35 U.S.C. 154(b) by 160 days.

(21) Appl. No.: 13/208,202

(22) Filed: Aug. 11, 2011

(65) Prior Publication Data

US 2012/0062399 A1    Mar. 15, 2012

Related U.S. Application Data

(60) Provisional application No. 61/373,176, filed on Aug. 12, 2010.

(51) Int. Cl.
*H03M 7/00*    (2006.01)

(52) U.S. Cl.
USPC .............................................. 341/50; 341/51

(58) Field of Classification Search
USPC ...................................................... 341/50–51
See application file for complete search history.

(56) References Cited

U.S. PATENT DOCUMENTS 8,208,858 B2 *  6/2012  Mow et al. .................... 455/63.4
8,306,092 B2 * 11/2012  Wu et al. ....................... 375/146

OTHER PUBLICATIONS

F. Brglez, X. Y. Li, M. F. Stallmann1 and B. Militzer, "Reliable cost predictions for finding optimal solutions to LABS problem: Evolutionary and alternative algorithms," Proc. 5th Int. Workshop on Frontiers in Evolutionary Algorithms (FEA'2003) under JCIS'2003, Cary, NC, USA, Sep. 2003, 5 pages.
G. Coxson and J. Russo, "Efficient exhaustive search for optimal-peaksidelobe binary codes," IEEE Trans. Aerospace Electron. Syst., 41(1), Jan. 2005, 302-308.
X. Deng and P. Fan, "New binary sequences with good aperiodic autocorrelations obtained by evolutionary algorithm," IEEE Commun. Lett., 3(10), Oct. 1999, 288-290.
I. Dotu and P. van Hentenryck. "A note on low autocorrelation binary sequences," in F. Benhamou, editor, 12th Int. Conf. on Principles and Practice of Constraint Programming (CP 2006), Nantes, France, Sep. 2006, Springer, , LNCS vol. 4204, 685-689.
K.-L. Du and M. N. S. Swamy, Neural Networks in a Softcomputing Framework, Springer, London, 2006, 66 pages.
M. A. Ferrara, "Near-optimal peak sidelobe binary codes," Proc. IEEE Conf. on Radar, Apr. 2006, 400-403.
J. E. Gallardo, C. Cotta, A. J. Fernandez, "A memetic algorithm for the low autocorrelation binary sequence problem," Proc. 9th Annual Conf. on Genetic and Evolut. computat., London, England, 2007, 1226-1233.
M. J. E. Golay, "The merit factor of long low autocorrelation binary sequences," IEEE: Trans. on Inf. Theory, 28, May 1982, 543-549.
S. W. Golomb, Shift Register Sequences, San Francisco: Holden-Day, 1967, 8 pages.

(Continued)

*Primary Examiner* — Khai M Nguyen
(74) *Attorney, Agent, or Firm* — Turocy & Watson, LLP

(57) ABSTRACT

Systems, methods, and computer-readable media for determining long binary sequences having low autocorrelation functions using evolutionary processes are disclosed. Biphase sequences are found with low peak sidelobe values meeting a predetermined criterion, e.g., threshold low autocorrelation function, including application of semidefinite programming in connection with determining an initial population, and evolving the population with an evolutionary algorithm to bits of the biphase sequences including bit flipping. The found biphase sequences can be communicated to a variety of applications, including wireless communications technologies.

42 Claims, 10 Drawing Sheets

OTHER PUBLICATIONS

F. Hu, P. Z. Fan, M. Darnel and F. Jin, "Binary sequences with good aperiodic autocorrelation functions obtained by neural network search," Electron. Lett., 33(8), Apr. 1997, 688-690.

J. Jedwab and K. Yoshida, "The peak sidelobe level of families of binary sequences," IEEE Trans. Inf. Theory, 52(5), May 2006, 2247-2254.

A. E. Kocabas and A. Atalar, "Binary sequences with low aperiodic autocorrelation for synchronization purposes," IEEE Commun. Lett., 7(1), Jan. 2003, 36-38.

S. Mertens, "Exhaustive search for low-autocorrelation binary sequences," J Phys A: Math Gen, 1996, 29, L473-L481.

B. Militzer, M. Zamparelli, and D. Beule, "Evolutionary search for low autocorrelated binary sequences," IEEE Trans. Evolut. Computat., 2(1), Apr. 1998, 34-39.

W. H. Mow, "Best quadriphase codes up to length 24," Electronics Lett., May 1993, 29(10), 923-925.

B. Natarajan, S. Das, and D. Stevens, "An evolutionary approach to designing complex spreading codes for DS-CDMA," IEEE Trans. Wirel. Commun., 4(5), Sep. 2005, 2051-2056.

S. Prestwich, "A hybrid search architecture applied to hard random 3-SAT and low-autocorrelation binary sequences," Proc. 6th Int. Conf. on Principles and Practice of Constraint Programming, LNCS 1894, Springer-Verlag, 2000, 337-352.

B. W. Kernighan and S. Lin, "An efficient heuristic procedure for partitioning graphs," Bell Syst. Tech. J., 1970, 291-307.

T. Koike and S. Yoshida, "Genetic designing of near-optimal training sequences for spatial multiplexing transmissions," Proc. 10th Asia-Pacific Conf. on Commun. and 5th Int. Symp. on Multi-Dimensional Mobile Commun., 2004, 474-478.

K. V. Rao, V. U. Reddy, "Biphase sequence generation with low sidelobe autocorrelation function," IEEE Trans. Aerospace Electron. Syst., 22(2), Mar. 1986, 128-133.

H. D. Schotten, H. D. Luke, "On the search for low correlated binary sequences," Int. J. Electron. Commun. (AE) 59 (2005) 67-78.

S. Wang and X. Ji, "An efficient heuristics search for binary sequences with good aperiodic autocorrelations," Proc. IEEE WiCom, Sep. 2007, 763-766.

M. Golay, "A class of finite binary sequences with alternate auto-correlation values equal to zero (corresp.)," IEEE Trans. Inform. Theory, vol. 18, No. 3, pp. 449, 450, May 1972.

C. J. Nunn and G. E. Coxson, "Best-known autocorrelation peak sidelobe levels for binary codes of length 71 to 105," IEEE Trans. Aerosp. Electron. Syst., vol. 44, No. 1, pp. 392-395, Jan. 2008.

A. Dzvonkovskaya and H. Rohling, "Long binary phase codes with good auto-correlation properties," in Proceedings of 2008 International Radar Symposium, Wroclaw, May 2008, pp. 1-4.

M. Grant and S. Boyd, "CVX: Matlab software for disciplined convex programming (web page and software)," Dec. 2008. [Online]. Available: http://cvxr.com/cvx/, 2 pages.

J. Dahl, B. H. Fleury, and L. Vandenberghe, "Approximate maximum-likelihood estimation using semidefinite programming," in Proc. Int'l Conference on Acoustics, Speech, and Signal Processing, vol. 6, Apr. 2003, pp. 721-724.

\* cited by examiner

DETERMINATION OF LONG BINARY SEQUENCES HAVING LOW AUTOCORRELATION FUNCTIONS

PRIORITY CLAIM

This application claims priority to U.S. Provisional Patent Application Ser. No. 61/373,176, filed on Aug. 12, 2010, entitled "SEARCH FOR LONG LOW AUTOCORRELATION BINARY SEQUENCES BY EVOLUTIONARY ALGORITHMS". The entirety of the aforementioned application is incorporated by reference herein.

TECHNICAL FIELD

This disclosure generally relates to determination of long binary sequences having low autocorrelation functions using evolutionary processes.

BACKGROUND

In an asynchronous spread spectrum (A-SS) system, as relative delays between signals transmitted can be arbitrary, it is desirable to find spreading sequences with low aperiodic autocorrelation functions (ACFs). Searching for binary sequences with low peak sidelobe level is a conventional problem that has raised computational challenges to researchers in this area, and the problem is sometimes referred to as the search for low-autocorrelation binary sequences (LABS). Among other uses, these binary sequences can be used for pulse compression in radar scenarios, channel synchronization and tracking, wireless CDMA communication, and theoretical physics.

Considering a binary sequence of length L, $a = a_1 a_2 \ldots a_L$, its autocorrelation function (ACF) is given by equation (1):

$$C_k(a) = \sum_{i=1}^{L-k} a_i a_{i+k}, \quad a_i = \{-1, +1\}, k = 1, \ldots, L-1 \quad (1)$$

The above definition for ACF of equation (1) can be extended to $k = -L+1, \ldots, L-1$. For instance, similar to equation (1), the aperiodic autocorrelation function can be defined according to equation (2):

$$C_a(t) = \begin{cases} \sum_{n=0}^{L-t-1} a_n a_{n+t}^*, & 0 \leq t \leq L-1 \\ \sum_{n=0}^{L-t+1} a_n a_{n-t}^*, & 1-L \leq t < 0 \\ 0, & |t| \geq L \end{cases} \quad (2)$$

where $(.)^*$ denotes conjugation (for cases when $a_n$ is complex valued).

With reference to equation (1), at $k=0$, the peak ACF L is obtained, and the elements of ACF for $k \neq 0$ are called sidelobes. The peak sidelobe level (PSL) for length L is defined as equation (3):

$$PSL_L = \min_{a \in \{-1,+1\}^L} \max_{1 \leq k \leq L-1, k \neq 0} |C_k(a)| \quad (3)$$

Similarly, the PSL of a sequence a can be expressed as equation (4):

$$PSL(a) = \max_{1 \leq t \leq L-1} \left| \sum_{n=0}^{L-t-1} a_n a_{n+t}^* \right|, \quad (4)$$

The merit factor, F of a, to denote a M-phase sequence has conventionally been defined by equation (5):

$$F(a) = \frac{L^2}{2 \sum_{k=1}^{L-1} C_k^2(a)} \quad (5)$$

The sum term in the denominator of equation (5) is called the energy, with $a_n$ as its n-th component, for $n = 0, 1, \ldots, L-1$, where L is the length of the sequence. The asymptotic value for the maximum F has been given as: $F \to 12.3248$ as $L \to \infty$. In this regard, sequence search attempts to find a sequence with minimum PSL or optimum F.

The LABS, or maximum merit factor, problem is a hard problem since there are numerous local minima as well as many optima. For example, a full exhaustive search for L=64 has yielded 14872 optimal-PSL codes and the optimal PSL is 4, even though these codes have a wide variability of merit factors. In this regard, a main problem is that the conventional gradient and other search approaches tend to become trapped in bad local minima. The aperiodic ACF of a length-L binary sequence has L−1 sidelobes that are not equivalent. A binary array of size K×K with $L=K^2$ has $2K(K-1)$ sidelobes.

Both PSL and the merit factor F have been used as criteria for determining the quality of sequences. However, due to limitations on computational power, for a given temporal need or application requirement, it becomes harder to find optimal sequences for long sequence lengths because the search space S considered grows exponentially with the sequence length L. In order to find the sequences with lowest PSL with respect to their corresponding length L, the most direct way is exhaustive search. In total, however, experimental results of a total of $2^L$ binary sequences of length L with $O(L^2)$ operations have to be computed algebraically to find the optimal sequences with exhaustive search—a large number with large length L.

Results for a branch-and-bound algorithm included report of a runtime complexity of $O(1.85^L)$ to find optimal merit factors for $L \leq 60$, while symmetry breaking procedures for identifying equivalent sequences allow the search space to be reduced to approximately one-eighth. A similar approach has been applied to exhaustive search. In addition, a sidelobe invariant tranform, a branch-and-merge search strategy, PSL-preserving operations, symmetry breaking, partitioning and parallelizing the search have been applied, further reducing the time complexity to $O(1.4^L)$ [4, 36].

Some exact values of best PSL have been found by exhaustive search and are summarized as follows:
1) $PSL \leq 1$ for $L = 2, 3, 4, 5, 7, 11, 13$. These sequences are known as Barker sequences.
2) $PSL \leq 2$ for $L \leq 21$,
3) $PSL \leq 3$ for $L \leq 48$,
4) $PSL \leq 4$ for $L \leq 70$.

For odd L, a particular subclass of the skew-symmetric sequences has the property of $a_{n+i} = (-1)^i a_{n-i}$, $n = (L+1)/2$, for $i = 1, \ldots, n-1$. For these sequences, $C_k = 0$ for all odd k. Since the right half of the sequence is determined by the left half, sequence search is reduced to the general LABS problem for $(L+1)/2$. Searching the skew-symmetric sequences reduces the effect size of the sequence length by a factor of two. But for some values of L, it is noted energies are present well above the true ground state energy.

As further background, there are some special classes of low-autocorrelation binary sequences. Maximal-length shift register sequences (m-sequence) are pseudonoise (PN) sequences of length $L=2^n-1$, $n=1, 2, \ldots$, which can be generated by shift registers. Legendre sequences are another class of PN sequences. By presenting a method to generate Legendre sequences for prime lengths in the range of 67 to 1019, the computation of aperiodic ACF of cyclically shifted Legendre sequences has been performed, where, for larger L, the best known results can be achieved by periodically extending cyclically shifted Legendre sequences.

An integer programming method for the LABS problem at any L has computed PSL values and F (for L=71 through 100) of the sequences by using a Mixed-Integer Linear Programming (MILP) solver. In general, the minimal PSL values that are obtained are not better than the minimal PSL values obtained by an evolutionary algorithm (EA), but according to results, the integer programming method generates a lower PSL of 5 at L=74.

Some stochastic search methods such as simulated annealing (SA) or EAs can be applied for escaping local minima. One stochastic approach has reported a runtime complexity of $O(1.68^L)$. Compared to a Kernighan-Lin solver at $O(1.463^L)$ runtime, an evolutionary strategy (ES)-based search for optima may require significantly fewer samples (on average), e.g., $O(1.397^L)$ at runtime, as the problem size increases.

In some aspects, the performance of EAs is superior to other stochastic search algorithms. Popular conventional EAs are the genetic algorithm (GA), the evolutionary strategies (ES), and the memetic algorithm (MA).

For instance, one GA method that has been applied first generates a population of size P, then generates some offspring by one-point or two-point mutation, and others by one-point crossover. Unlike conventional GA approaches that use a proportional probabilistic selection mechanism, elistism is applied: P offspring with the best fitness are then selected as the parents in the next generation. For $L \geq 71$, due to the size of the length and associated complexity of computation, a number of non-exhaustive heuristic approaches, such as stochastic methods, genetic algorithm, integer programming method, have been proposed to search for sequences with minimal PSL. One example taking advantage of parallel processing with multiple cores, for sequences with lengths from 71 to 105, listed the following results:

5) $PSL \leq 4$ for $71 \leq L \leq 82$,
6) $PSL \leq 5$ for $83 \leq L \leq 105$.

Notwithstanding the above approaches, there is still no method other than exhaustive search that can give the exact minimal PSL among the whole search space $S \in \{-1,1\}^L$. While high-performance parallel computing clusters could provide good results, these systematic search methods would still lack scalability to search for ever longer sequences without mathematical/algorithmic insights in a limited-resources (time and memory) scenario.

Some conventional heuristic methods for searching sequences with low autocorrelation sidelobes attempted to search for sequences above L=70. With the employment of EA in one such approach, binary sequences with acceptable aperiodic ACF have been obtained. First of all, the algorithm starts with initial random generation of parent sequences. Then, mutation and crossover are applied to generate a controllable number of children sequences and the following fitness function is used, $$f_1(a) = \frac{\alpha}{PSL(a)} + \beta F(a) \quad (6)$$

where $\alpha$, $\beta$ are scaling factors.

With respect to fitness, when $\alpha=0$ and $\beta \neq 0$, the fitness function corresponds to minimum PSL; when $\alpha \neq 0$ and $\beta=0$, the fitness function corresponds to the maximum F. A list of sequences of lengths 49--100 is given. The obtained PSL values obtained were shown to be the same or better than the PSL values obtained using the Hopfield neural network for searching good binary sequences. In another EA approach, P parents are generated, and then O offspring are generated by one-point crossover; the P+O individuals compete and the P best individuals survive as next generation; one-point or two-point mutation is applied only when some of the P best individuals have the same fitness, or PSL.

In another approach, ES has been used for LABS for optimum F, where a preselection operation is applied to the generated individuals from mutation. The fitness is thus used for evaluating the performance of both parent and children sequences. Note that if $\alpha=0$ and $\beta \neq 0$, the fitness function computes the values (performance) of sequences depending on the merit factor F only; on the other hand, if $\alpha \neq 0$ and $\beta=0$, the sequences are evaluated towards their corresponding PSL only.

The MA has also been used for the LABS problem. In one approach, an ES is used as the EA, and a local search is implemented by flipping each bit of the string. The fitness function is selected as equation (7):

$$f_2(a) = \frac{F(a)}{PSL(a)} \quad (7)$$

For this approach, the obtained F was greater that the above noted approach for L=71 to 100, but the PSL is typically worse. In yet another approach, the bit-flipping or tabu search is used as the local search, for maximizing F. The MA with tabu search is more effective in finding the optimum than the Kernighan-Lin and the MA with bit climber, from the experiments of $L \leq 60$. The MA with tabu search is an order of magnitude faster than the pure tabu search with frequent restarts, and the latter is roughly on par with Kernighan-Lin solver for the LABS problem, with respect to maximizing F. A multiobjective EA has also been used to generate complex spreading sequences with acceptable crosscorrelation and/or autocorrelation properties for some applications. The GA has also been used to generate acceptable training sequences for multiple antenna (spatial multiplexing) systems. In consideration of the various conventional approaches to generating or searching for LABs, an effective approach for generating long sequences, e.g., L>70, is desired under constrained circumstances where exhaustive search is not a realistic option, e.g., where time, processing capability, power and/or memory are constrained.

The above-described deficiencies are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

In accordance with various embodiments, the subject application pertains to determining long binary sequences having low autocorrelation functions using evolutionary processes. In an example embodiment, a method comprises generating, by a computing device, an initial population of parent binary sequences of bits with reference to an output of a semidefinite programming formulation that minimizes with respect to an autocorrelation function of values of the bits. The semidefinite programming formulation can apply dual windowing with respect to the autocorrelation function of values of the bits. The method further comprises flipping the bits of the parent binary sequences one by one and, for each flipped bit, keeping a value of the flipped bit in a respective parent binary sequence of the parent binary sequences in response to the flipped bit representing an increase of parent fitness evaluated according to a fitness function. In addition, the method can comprise randomly selecting a parent sequence of the parent binary sequences and applying two-point mutation to the parent sequence including generating a predefined number of offspring binary sequences from the parent sequence.

The method can further comprise flipping the bits of the offspring binary sequences one by one and, for each flipped bit, keeping a value of the flipped bit in a respective offspring binary sequence of the offspring binary sequences in response to the flipped bit representing an increase of offspring fitness evaluated according to the fitness function. The flipping can include performing a partial restart of the flipping for a fixed number of generations. In addition, for each flipped bit of the offspring binary sequences, in response to the flipped bit not representing an increase of the fitness evaluated according to the fitness function, an old value of the flipped bit from prior to the flipping can be kept.

The method can further comprise ranking the parent binary sequences and the offspring binary sequences according to respective fitnesses evaluated according to the fitness function, and based on the ranking, selecting a set of binary sequences from the parent binary sequences and the offspring binary sequences as a new generation of parent binary sequences. The method can further comprise repeating the process for the new generation of parent binary sequences, e.g., a predetermined number of times. The binary nature of the method can be extended to quadriphase sequences represented as a function of binary sequences.

In another example embodiment, a system includes a sequence search component configured to find bi-phase sequences of bits having autocorrelation function of values of the bits that meet a predetermined condition of low autocorrelation, and in connection with search for the bi-phase sequences. The sequence search component is further configured to generate an initial population of parent bi-phase sequences of bits with reference to an optimal solution of a semidefinite programming equation applied to the bi-phase sequences, flip the bits of the parent bi-phase sequences one by one and, for each flipped bit, keep a value of the flipped bit in a respective parent bi-phase sequence of the parent bi-phase sequences in response to the flipped bit representing an increase of parent fitness evaluated according to a fitness function. The sequence search component is further configured to randomly select a parent sequence of the parent bi-phase sequences and apply two-point mutation to the parent sequence including generation of a predefined number of offspring bi-phase sequences from the parent sequence. In addition, a communications component is configured to communicate as a function of a bi-phase sequence of the bi-phase sequences found by the sequence search component, e.g., for real-world application.

In another example embodiment, a computer-readable storage medium stores computer executable instructions that, in response to execution, cause a computing system to perform operations including determining biphase sequences with low peak sidelobe values meeting at least one predetermined criterion including solving a semidefinite programming formulation; and evolving the biphase sequences of bits with an evolutionary algorithm including bit climbing, wherein the bit climbing includes flipping the bits one by one and evaluating a pre-selected fitness function in connection with determining whether to retain a flipped or non-flipped value.

In still another example embodiment, a wireless communications apparatus comprises means for searching for biphase sequences with low peak sidelobe values meeting a predetermined criterion including means for optimizing a semidefinite programming equation and means for applying an evolutionary algorithm to bits of the biphase sequences and means for communicating based on a binary sequence output from the means for searching.

The following description and the annexed drawings set forth in detail certain illustrative aspects of the disclosed subject matter. These aspects are indicative, however, of but a few of the various ways in which the principles of the subject application can be employed. The disclosed subject matter is intended to include all such aspects and their equivalents. Other advantages and distinctive features of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Overview

As mentioned in the background, binary sequences with low aperiodic ACFs) can be used in a wide variety of applications, and a variety of conventional systems have been proposed. In this regard, search for binary sequences with low autocorrelation is a combinatorial optimization problem. Due to non-polynomial complexity for a length above 70, an exhaustive search method is usually not applied, and thus alternative formulations are desirable for binary sequences of longer length, e.g., for a length above 70, though, for the avoidance of doubt, the various embodiments herein can be applied to sequences of less than or equal to length 70.

In various embodiments, an evolutionary algorithm for searching low-autocorrelation binary sequences is provided that includes new elements or aspects not applied by prior evolutionary approaches. By incorporating such aspects, the various embodiments disclosed herein can efficiently find optimal or better near-optimal solutions than existing methods.

In various embodiments, an optimization approach to sequence search includes a semidefinite programming (SDP) approach with the incorporation of an evolutionary algorithm (EA) for searching binary sequences having low peak sidelobe levels that outperforms conventional systems. SDP is a subfield of convex optimization concerned with the optimization of a linear objective function over the intersection of the cone of positive semidefinite matrices with an affine space, e.g., a spectrahedron.

Various non-limiting embodiments of systems, methods, computer readable storage media, and apparatuses presented herein pertain to determining long binary sequences having low autocorrelation functions using evolutionary processes are now presented in more detail below.

Determination of Long Binary Sequences Having Low Autocorrelation Functions

Figure 1:
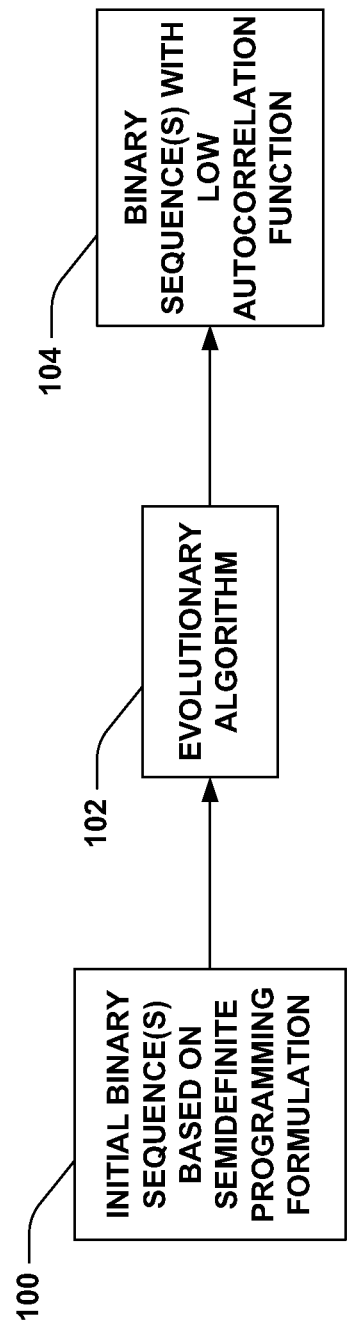
FIG. 1 is an example block diagram representing a non-limiting embodiment for applying an EA to the LABS problem in accordance with the subject disclosure.

Evolutionary algorithms (EAs) can be applied to the LABS problem since the binary nature of the LABS problem is suited for binary representations implemented by some EAs. As shown generally in the block diagram of FIG. 1, a binary sequence 100 can undergo an EA 102 to generate a subsequent sequence 104 with a new autocorrelation function. In this respect, the various embodiments herein are demonstrated to be well suited for sequence lengths longer than 70.

By way of further overview of EAs, the GA can be coded in a binary string, and crossover and mutation are then used to change a population, in this case, to achieve a low autocorrelation function. The evolutionary strategy (ES) usually codes variables as real numbers, and mutation is used for genetic operation.

The GA employs a probabilistic selection scheme for parents for mating, according to their fitness. The ES takes the form of either a $(\mu, \lambda)$ or $(\mu+\lambda)$ scheme, where $\mu$ is the number of children that are generated and $\lambda$ is the number of individuals that are selected as parents for the next generation. The $(\mu, \lambda)$ scheme selects $\lambda$ individuals from the $\mu$ generated children as the parents for the next generation, while the $(\mu+\lambda)$ scheme selects $\lambda$ individuals from the pool of $\mu$ generated children and the $\lambda$ parents as the parents for the next generation. Unlike the GA, the ES selects the $\lambda$ best individuals as a population, and each individual in the population has the same mating probability.

The memetic algorithm (MA), also called the cultural algorithm, was inspired by the propagation of human ideas and Dawkins' notion of meme. The MA can be implemented as the GA or the ES, plus performance with a local search, and thus the MA is sometimes also known as a genetic local search. The use of the local search can substantially reduce total number of fitness function evaluations. The lines between respective implementations of the GA, ES and MA have become blurred, since conventional implementations have tried to improve the performance by borrowing ideas from one another. Together, these techniques are collectively known as EAs.

In various embodiments disclosed in more detail below, a search for biphase sequences with low peak sidelobe values is performed by using a combination of semidefinite programming (SDP) together with an evolutionary algorithm (EA).

As $C_a$ is the autocorrelation of a, X can be defined:

$$X = a^T \cdot a \quad (8)$$

And the vector $C_a$ can be defined as a linear combination of the elements of X, which can be represented as equation (9):

$$C_a = Q \cdot \text{vec}(X), \quad (9)$$

where $X = a^T \cdot a$ and Q is a fixed matrix that performs the sums of the diagonals while $\text{vec}(\cdot)$ is an operator that stacks the columns of the X into a long vector.

For example, let $a = [1\ -1\ 1]$. Then, $$\begin{aligned} X &= a^T \cdot a \\ &= [1-1\ 1]^T \cdot [1-1\ 1] \\ &= \begin{bmatrix} 1 & -1 & 1 \\ -1 & 1 & -1 \\ 1 & -1 & 1 \end{bmatrix} \end{aligned} \quad (10)$$

and $$Q = \begin{bmatrix} 1 & 0 & 0 & 0 & 1 & 0 & 0 & 0 & 1 \\ 0 & 0 & 0 & 1 & 0 & 0 & 0 & 1 & 0 \\ 0 & 0 & 0 & 0 & 0 & 0 & 1 & 0 & 0 \end{bmatrix}. \quad (11)$$

The autocorrelation function of a then becomes equation (12):

$$C_a = Q \cdot \text{vec}(X) = [3 - 2\ 1]. \quad (12)$$

In this regard, the mainlobe, $C_a(0)$, is the sum of the diagonal elements of X while the successive sidelobe level, $C_a(1)$, is the sum of the diagonal on top of the main diagonal of X, etc.

Then, as provided in various embodiments herein, an optimization problem for finding sequences is solved with desired sidelobe values within dual windows by applying semidefinite programming Building on the above notation, the problem can be formulated as shown in equation (13):

$$\begin{aligned} & \underset{X,a,C_a}{\text{minimize}} \ \underset{1 \leq t \leq L-1}{\max} |C_a(t)|, \\ & \text{subject to } X = a^T \cdot a \\ & C_a = Q \cdot \text{vec}(X) \\ & a_n \in \{-1, +1\}, n = 0, \ldots, L-1. \end{aligned} \quad (13)$$

where X, a, $C_a$ are the optimization variables. The term $a_n \in \{-1, +1\}$ can be expressed in convex form as $X_{ii} = 1$, in which case equation (13) can be rewritten as equation (14):

$$\underset{X,a,C_a}{\text{minimize}} \underset{1 \leq t \leq L-1}{\max} |C_a(t)|, \quad (14)$$

subject to $X = a^T \cdot a$ $C_a = Q \cdot vec(X)$ $X_{ii} = 1, i = 0, \ldots, L-1.$ Since the first constraint is not convex, it can be relaxed to the following $$X \geq a^T \cdot a. \quad (15)$$

By using a nonlinear programming solver, the problem can be further relaxed to the following form of equation (16):

$$\underset{X,a,C_a}{\text{minimize}} \underset{1 \leq t \leq L-1}{\max} |C_a(t)|, \quad (16)$$

subject to $X \geq a^T \cdot a$ $C_a = Q \cdot vec(X)$ $X_{ii} = 1, i = 0, \ldots, L-1.$ After solving the relaxed problem of equation (16), a randomization method can be applied to obtain an optimal point of the original problem. In this regard, entries of a remain as 0 and entries of X and $C_a$ are non-zero real numbers. Then, sample sequences are generated based on a normal distribution $a:N(a, X-a^T \cdot a)$ and discretization of the samples by taking the sgn(a) function.

The randomization procedure can be applied as follows. First, points a are sampled with a normal distribution N(0,X), where X is the optimal solution of equation (16). Then, feasible points are found by taking $\hat{a}$=sgn(a). After inspecting a number of random sequences, an optimal solution with low sidelobe values is obtained. For the case of searching quadriphase sequences, similar modifications are used for solving equation (16) with the last constraint replaced by $a_n \in \{-1,+1,-j,+j\}$ and the desired solution can be found by the randomization approach. This semidefinite programming approach can be used together with an evolutionary algorithm discussed as follows.

In addition to the PSL and F measures, in an embodiment, another objective function is defined as the fitness function of equation (17):

$$f_3(a) = \frac{1}{\sum_{k=1}^{L-1} (C_k(a))^{2\gamma}} \quad (17)$$

where $\gamma=1,2,\ldots$. The value of $\gamma$ decides the weight of the maximum $C_k(a)$. This objective, which is proportional to sidelobe energy, considers the squares of sidelobe levels of the sequences. When $\gamma=1$, $f_3(a)$ is proportional to and dependent on F (a). In contrast, the PSL measure considers only the largest sidelobe. In the LABS problem, many $C_k(a)$'s may have the same maximum values; in this case, the PSL measure considers one of these optima. For large $\gamma$, if there is only one main peak, $f_3(a)$ operates with similar results as $$\frac{1}{PSL(a)}.$$

Turning to application of an EA for the LABS problem with auxiliary aspects, first, it is noted that the classic GA is inefficient due to a probabilistic selection/reproduction mechanism and probabilistic crossover/mutation operations. However, some ideas can be borrowed from ES and MA to improve search efficiency. Accordingly, in one embodiment, EA is applied to the LABS problem with one or more of the following aspects:

(1) Crossover operation is not applied. Since there can be many optima as well as numerous local minima in different regions of the fitness ladscape, crossover of two such individuals from different regions generally leads nowhere. Typically, two selected individuals for crossover will be in different regions, and crossover thus degrades to random search.

(2) Selection is elitic. The ($\mu+\lambda$) ES scheme is applied. In a real-coded ES, the mutation strategies are evolved automatically by encoding them into the chromosome. In the binary-coded case, it is not efficient to evolve the mutation strategies.

(3) Two-point mutation is employed. Since bit-climber is applied on a mutated individual, the two-point mutation operation can be applied since one-bit mutation is reset by the bit-climber. Then, the fitness function $f_3$ can be used to evaluate the performance of sequences by applying the procedures of EA. The method can be implemented according to the following non-limiting details: (A) an initial population of parent sequences of size P is generated with reference to the optimal solution of equation (16) from the semidefinite programming formulation described herein. Meanwhile, the mutation operation can be controlled within a range so as to avoid the genetic search from degenerating into random search.

(4) The bit-climber is applied as a local search step. The bits of the string are flipped by flipping the bits of parent sequences one by one. Their corresponding value in the fitness function $f_3$ is then evaluated. If the newly flipped sequence has a higher fitness value, the newly flipped sequence replace the previous one in recognition of evolutionary superiority. For a single parent sequence, the fitness function value of L one-bit flipped versions of the parent sequence are computed.

(5) Partial restart, which can be applied for a fixed number of generations, can be implemented to improve the genetic diversity of the population for preventing premature convergence, since the elitism selection strategy and the two-point mutation (which has limited variation) may restrict the individuals to some regions with local minima resulting in premature convergence. Thus, partial restart can be implemented for a fixed number of generations, or implemented when premature convergence occurs.

For representation of the bit string of $a_k=-1$ or +1, the proposed EA algorithm for the LABS problem can be implemented according to the following non-limiting embodiment of EA for LABS, with bit climber. For the avoidance of doubt, the following pseudo code is but one implementation of an embodiment of the various embodiments described herein, and is included for illustrative purposes, and the various embodiments can be implemented according to a variety of programming languages, or in hardware, or a combination of software and hardware.

```
Procedure Main
Initialization:
    Set population size P,
        children number O,
        restart generation G_RS,
        maximal generation G_max,
        the population for partial restart P_RS.
    t:= 0.
    Randomize a_i, i = 1, ... ,P.
    for i: = 1 to P,
        a_i: = bit_climb(a_i), with fitness f_P(i).
    end for
    P := {(a_i,f_P(i))|i = 1, ... ,P}.
    for t: = 1 to G_max,
        if (t mod G_RS = 0),
            Randomize a_i, i = P + 1, ... ,P + P_RS.
            for i: = P + 1 to P + P_RS,
                a_i: = bit_climb(a_i), with fitness f_P(i).
            end for
            P := P ∪ {(a_i, f_P(i))|i = P + 1, ... ,P + P_RS}.
        end if
        for i: = 1 to O,
            (4) Randomly select a_k from P .
            Mutate a_k by pick the parent sequence and apply a
            two-point mutation to
the parent sequence. Repeat this process until O number of
offsprings are generated.
            b_i: = bit_climb(a_k), with fitness f_O(i).
        end for
        O := {(b_i, f_O(i))|i = 1, ... ,O}.
        Rank P ∪ O in descending fitness order.
        Take the first P individuals as P .
    end for
End Main
```

```
Procedure Bit_Climb
Input a with fitness f(a).
for i: = 1 to L,
    a_i: = -a_i.
    Evaluate the fitness g(a).
    if g(a) > f(a),
        f(a): = g(a).
    else
        a_i: = -a_i.
    end if
Return a with fitness f(a).
End Bit_Climb
```

The evaluation of the fitness function is on $O(L^2)$ for calculating $C_k(a)$'s. For the bit-climber, for each bit flip at $a_p$, $C_k(a)$ can be calculated from its previous value using the following equation (18):

$$C_k(a) = \begin{cases} C_k(a) - 2a_i a_{i+k}, & 1 \leq i \leq k \text{ and } i \leq L-k \\ C_k(a) - 2a_i(a_{i-k} + a_{i+k}), & k+1 \leq i \leq L-k \\ C_k(a) - 2a_{i-k}a_i, & L-k+1 \leq i \leq L \text{ and } i \geq k+1 \\ C_k(a), & \text{otherwise} \end{cases} \quad (18)$$

Equation (18) reduces the complexity for evaluating all $C_k(a)$ to $O(L)$. Since each mutated or randomly generated individual is subjected to L bit flips and fitness evaluations, the computational savings are close to L-fold. Compared to direct calculation of $C_k$'s, the computational time of the EA is reduced by a factor of 4 when calculating $C_k$'s for L=31 with equation (18), for instance.

Figure 2:
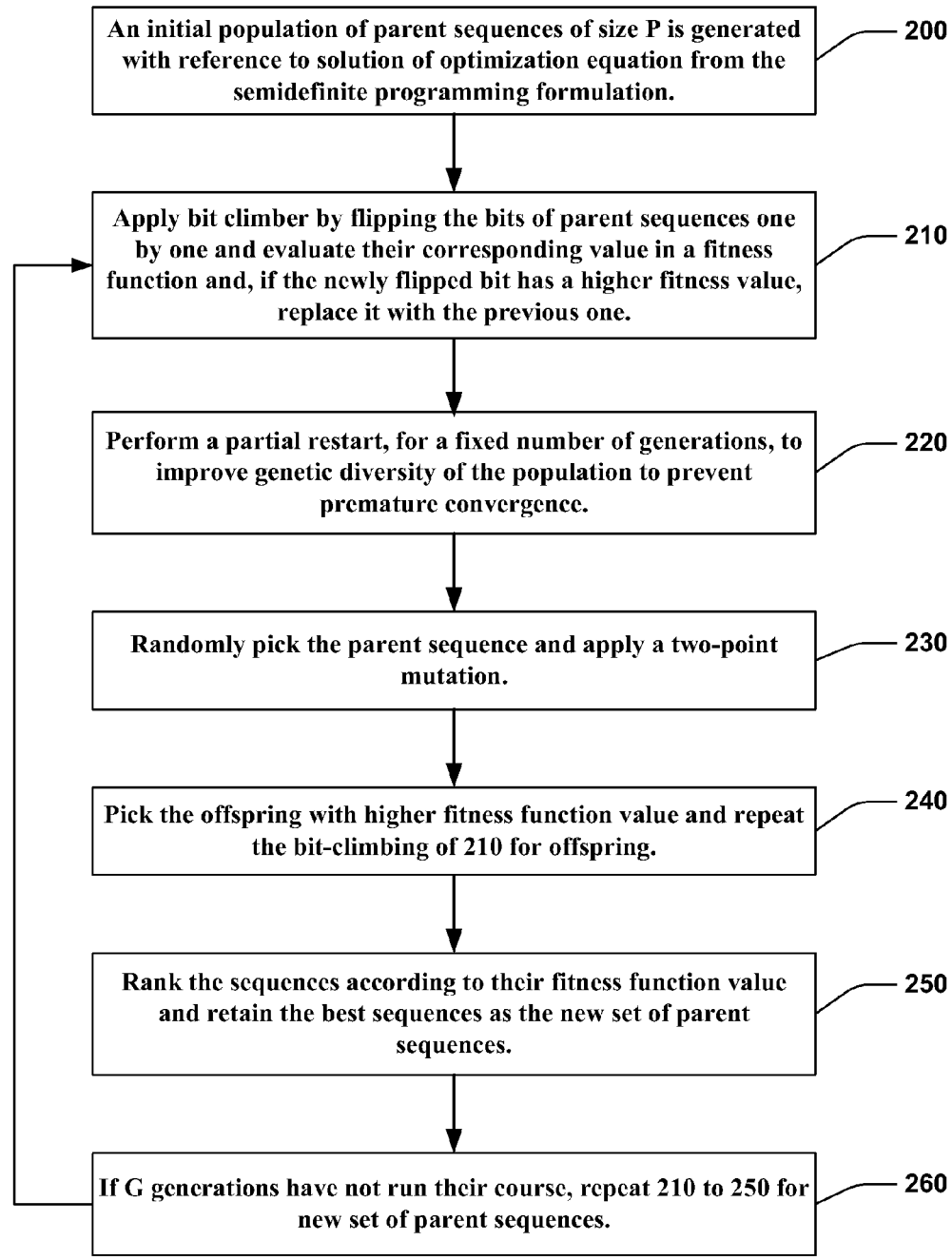
FIG. 2 is an example flow diagram representing a non-limiting process applying an EA to the LABS problem in accordance with the subject disclosure.

FIG. 2 is a flow diagram representing various aspects of one or more embodiments of an EA applied to the LABS problem as described herein. At 200, an initial population of parent sequences of size P is generated with reference to the optimal solution of equation (16) from the semidefinite programming formulation. At 210, bit-climber is applied by flipping the bits of parent sequences one by one. Their corresponding value in fitness function $f_3$ is evaluated and, if the newly flipped bit has a higher fitness value, it will replace the previous one. For a single parent sequence, the fitness value of L one-bit flipped versions of the single parent sequence is computed.

At 220, a partial restart, which includes a fixed number of generations, can be implemented to improve the genetic diversity of the population to prevent premature convergence. At 230, the parent sequence can be randomly picked and a two-point mutation can be applied to the parent sequence. This process can be repeated until O offsprings are generated. At 240, the bit-climbing of 210 can be repeated including picking the offsprings with higher fitness function value.

At 250, the P+O sequences are ranked according to their fitness function value and then the best P sequences are retained as the new set of parent sequences. At 260, the operations of 210 to 250 are repeated until G number of generations have run their course, i.e., 210 to 250 are repeated a selected number of times.

It is noted that the best quadriphase codes have improved PSL and MF performance over the best biphase codes. In this regard, the above-described embodiments of a modified EA algorithm can be extended to a quadriphase sequence search.

Figure 4:
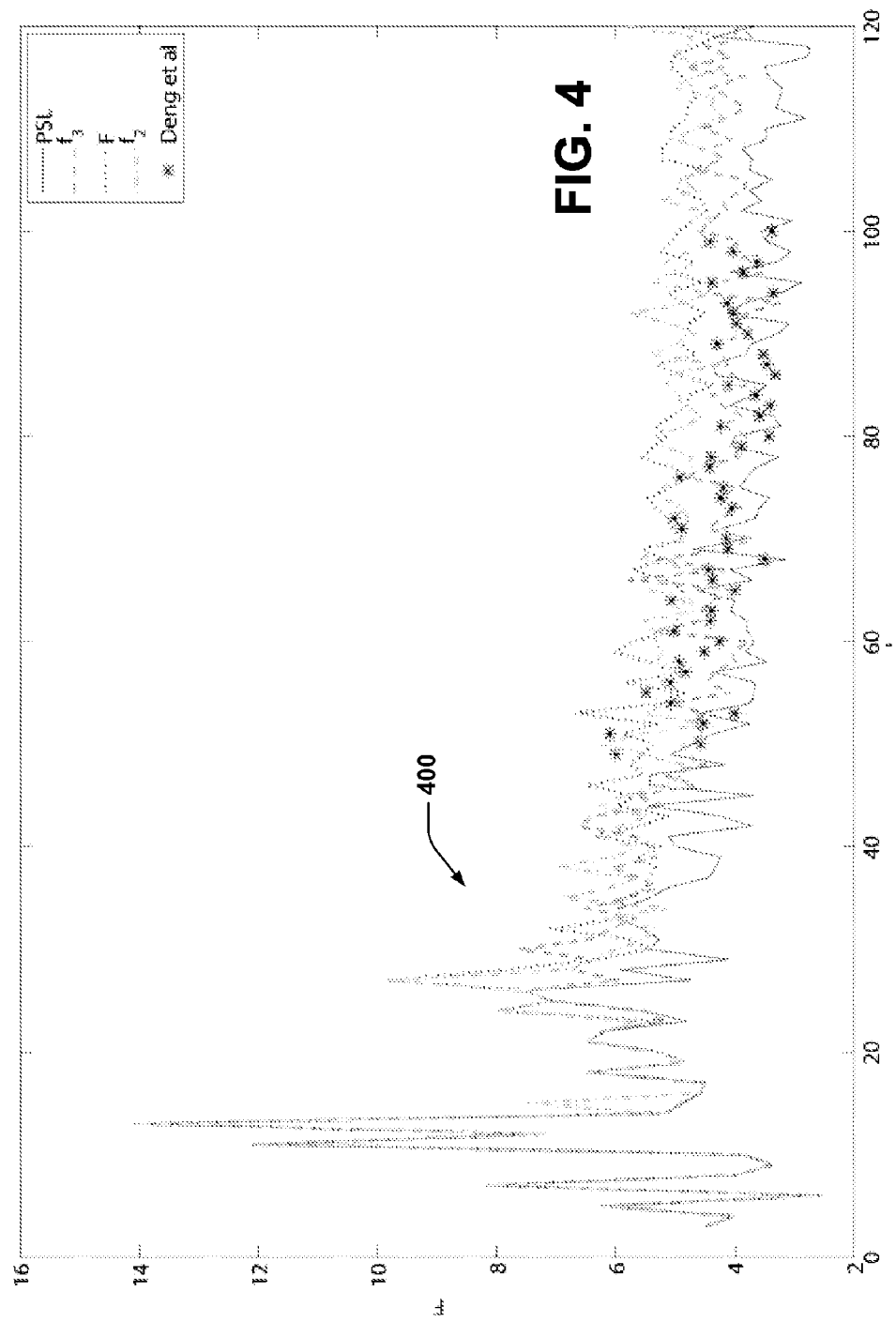
Figure 5:
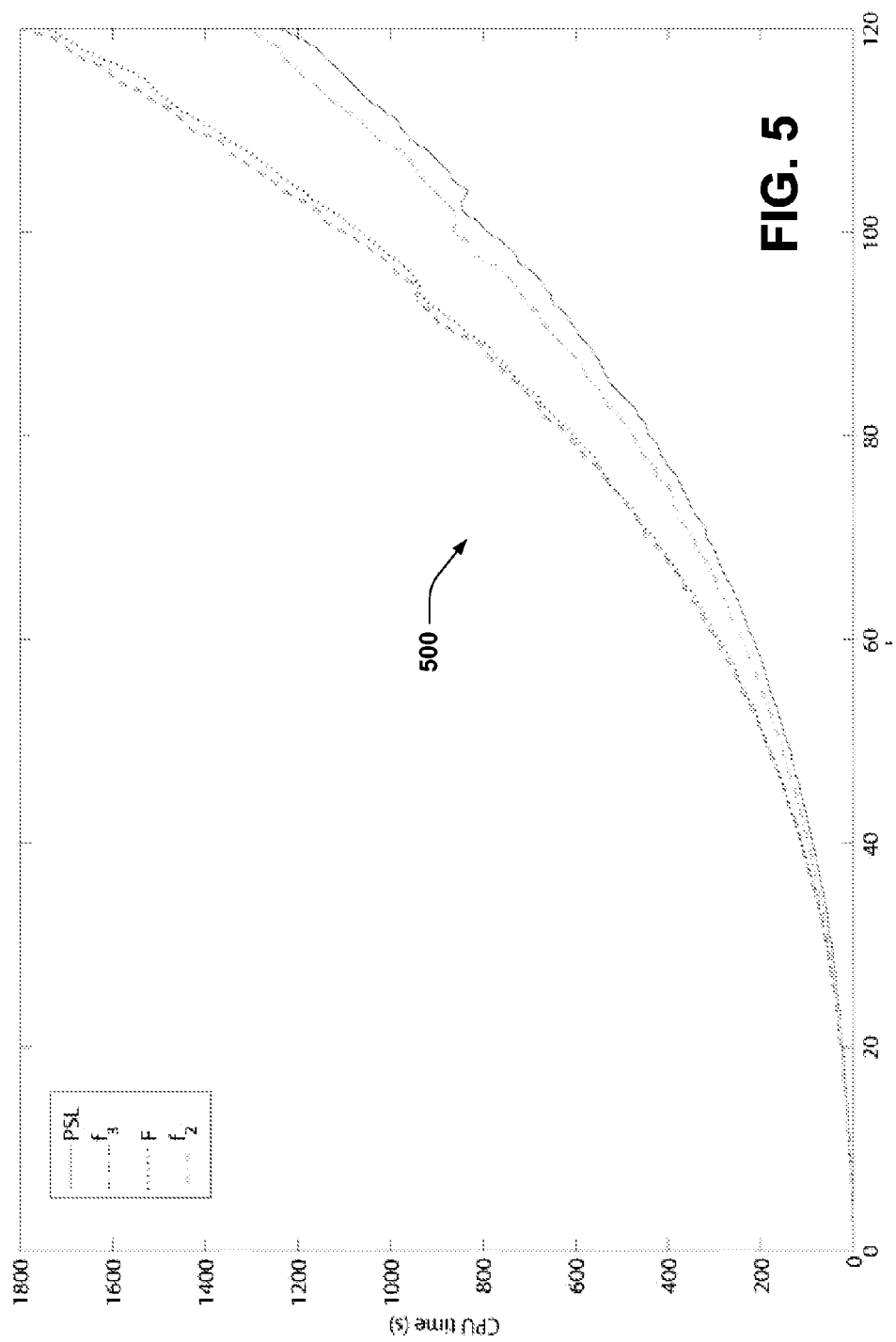

For some exemplary non-limiting results, the following settings were used: P=4L, O=20L, $G_{RS}$=5, $G_{max}$=100, $P_{RS}$=10L and four different fitness functions were evaluated. The results for a random run of the proposed EA are plotted in FIG. 3, for L=3 to 120, on graph 300. Various other results are also plotted for comparison. In this regard, some results are shown in graphs 300, 400 and 500 of FIGS. 3, 4, 5 graphically representing the best sequences for different lengths L relative to PSL, F, and computational time, respectively. "Deng et al." in the legend of FIGS. 3 and 4 refers to X. Deng and P. Fan, "New binary sequences with good aperiodic autocorrelations obtained by evolutionary algorithm," IEEE Commun Lett., vol. 3, no. 10, pp. 288-290, October 1999.

Figure 3:
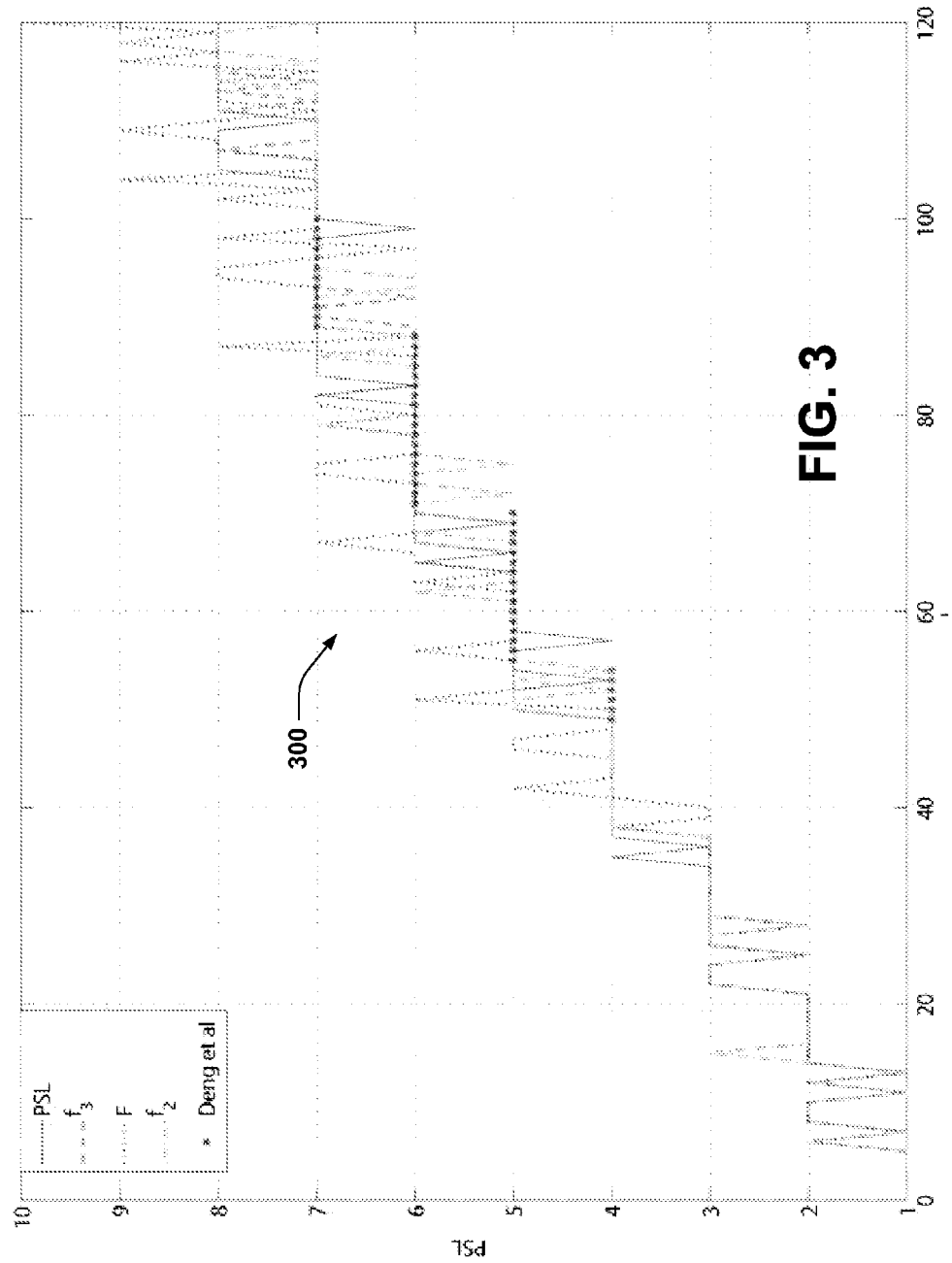
FIGS. 3, 4, 5 graphically represent best sequences for different lengths L relative to PSL, F, and computational time, respectively.

On the selection of objective (fitness) function, it can be observed from FIG. 3, that when PSL is selected as the fitness function, the F performance is the poorest. When F is selected as the fitness function, the PSL performance is poorest. A better tradeoff is achieved by the $f_3$ and $f_2$ functions. The computation time for each of the four cases is quadratic with respect to L. If $f_2$ is selected as the fitness function, at the interval L∈[49,100], PSL results are better compared to Deng et al at L=57, 72, 75, 89, 92, 93, 94, 97, 99.

In this regard, the EA-based LABS algorithm was executed with four fitness functions, each for five times. These results were compared and it was found that in terms of the PSL performance, the $f_2$ function gives the best result. We then applied the algorithm with the fitness function $f_2$ for five times. For L=71 to 77, 80, 89 to 99, the various embodiments described herein generally achieve the best results; for these lengths, these embodiments list the best sequences from the 25 runs (five times for each of the four fitness functions, and five times for fitness function $f_2$). In this sense, the algorithm proposed for implementation herein is much more effective in finding the better or optimum solutions for the LABS problem.

Randomized search, which is no guarantee for obtaining a good solution, is rather time consuming and does not attain even a local optimum apart of the objective problem. By generating a population of potential solutions by a semidefinite programming approach, the EA operates to select the best one at each iteration to successively update the parent sequences providing successively better approximations to an optimal solution. The use of this procedure prevents the final solution from becoming trapped in the local optima due to the randomized global search of the objective function.

The performance of the embodiments described herein is compared with other methods in the range of 71-100, for whichever technique has the best PSL case at the given length. The results are listed in Table 1 below, where all the solutions that are better than the best solutions so far are listed and marked with a '*' next to the given length.

TABLE 1

Best results in terms of Previous Best PSL

| L | PSL | F | Hexadecimal form | Best Previous PSL |
|---|---|---|---|---|
| 71 | 5 | 4.7112 | 4B95ADB55C6C3BE00C | 5 |
| 72 | 5 | 5.1024 | DDA9994AEFEB3CE1F0 | 5 |
| *73 | 5 | 5.4600 | 0ABD78C0FC276DCD659 | 6 |
|  | 5 | 4.3824 | 10C877F150398316A4B |  |
|  | 5 | 4.7243 | 193AAFCFC92D0BDE319 |  |
|  | 5 | 4.7243 | 1A0A387B3FB748DF729 |  |
| 74 | 5 | 5.0610 | 27FE19C9D4B51CBA34D | 5 |
| *75 | 5 | 5.1987 | 37440F6A90C0E2DE6BE | 6 |
| 76 | 5 | 4.0223 | A6D67E00CEA383214B9 | 5 |
| *77 | 5 | 4.8919 | 137B673D7AA185E17749 | 6 |
| 78 | 6 | 5.5612 | 34B371B56751DA38400F | 5 |
| 79 | 6 | 5.2445 | 0DE681F4B94151B3CEDD | 6 |
| *80 | 5 | 4.7059 | 227E545076D53A430984 | 6 |
| 81 | 6 | 5.3255 | 1DBB95F806AEB2D0E5B96 | 6 |
| 82 | 6 | 6.1688 | 151ABDA8C803B20C37869 | 5 |
| 83 | 6 | 5.8880 | 1CC3C9B0ABE2579A1008D | 6 |
| 84 | 6 | 5.2344 | AD0E85D5DECF359F306DC | 6 |
| 85 | 6 | 5.5237 | 035B4AF50E182E9BE6667F | 5 |
| 86 | 6 | 5.3828 | 187F8261C5CB296AB3BBDB | 6 |
| 87 | 6 | 5.8134 | 7E28E0AF71C8D894269244 | 6 |
| 88 | 6 | 5.4382 | B2CE67B674D787AB57E800 | 5 |
| 89 | 6 | 5.1569 | 1188C1828D1B63A6D0D417F | 6 |
| 90 | 6 | 5.1331 | 15AACF0C70363B2EEFA92FF | 5 |
| 91 | 6 | 4.5350 | 4F8A15206F9CC0B498882CA | 7 |
| *92 | 6 | 4.9324 | 3054FBB0525044B40F98E9C | 7 |
|  | 6 | 3.7989 | 6A9A0E4BD3B921E7DEC77EA |  |
|  | 6 | 4.0771 | C18CB17EED35290EF47457E |  |
|  | 6 | 4.8868 | 3259A2F4787BA52DC51DDFF |  |
|  | 6 | 4.7765 | EF172D475FB6E414C6C8273 |  |
|  | 6 | 4.1736 | 3BE7990240F4612BA922B34 |  |
| 93 | 6 | 4.8372 | 11A31F3008EA7DD97A5F49B5 | 6 |
| 94 | 6 | 4.9143 | 09B21D539703F5A59FDEF630 | 6 |
| *95 | 6 | 4.6473 | 000AA96396F449B1793989E5 | 7 |
| 96 | 6 | 4.7603 | 4AF4BF012EB9870D84441899 | 6 |
| *97 | 6 | 4.6858 | 18DD1986934F5E79AB4EEA17F | 7 |
|  | 6 | 4.3240 | 1A58BC874F780B2A776CF775D |  |
| *98 | 6 | 4.4422 | 209A8292360C762A77970861F | 7 |
| *99 | 6 | 3.4584 | 1BE4C0B5802382F572C64D6E3 | 7 |
|  | 6 | 4.5842 | 7C60E3FA55B41BAE67A8A40C8 |  |
| 100 | 7 | 5.4705 | 73A7423E750B68DB597464101 | 7 |

The program was also run for lengths 101 to 300 for three times, and the results are listed in Table 2.

TABLE 2

Some results between L = 101 to 300, obtained from a random run

| L | PSL | PSL Rao | F | Hexadecimal form |
|---|---|---|---|---|
| 101 | 7 | 6 | 5.0903 | 1434590F7BE4939702B215C8C6 |
| 102 | 7 |  | 5.1251 | 0F0E8C99669EA980F612D57FBD |
| *103 | 7 | 8 | 4.8267 | 6D7B5BBE63F441F3AE19A8B49E |
| | 7 | | 4.7235 | 34739B355C8FFBBF8225B42C3E |
| | 7 | | 5.2468 | 319DDFCBBC3536C035EAF92A78 |
| 104 | 7 | | 5.3020 | DB26545042EF04AC6738701C2D |
| 105 | 7 | | 4.9752 | 12B88ABC4F1ACD813BFF4F9E5A7 |
| 106 | 7 | | 5.0295 | 00542ADD9C19B68C2D2471D4F60 |
| 107 | 7 | 7 | 5.1805 | 198F1C3FC4FF5C8B25D4D952529 |
| 108 | 7 | | 4.6957 | B76DA4FA9F578883BD89DC75E14 |
| *109 | 7 | 8 | 4.7677 | 16E64682D7047F9F2AE9A7CEF2B9 |
| | 7 | | 5.0429 | 04210CC60FF325305D1D306A9756 |
| | 7 | | 5.0089 | 0A3056E2F6C39C22C9A8FEB44F7F |
| 110 | 7 | | 4.9631 | 06771127548108B1F5E92F03E496 |
| 111 | 7 | | 5.6260 | 6D0D79D790123A8553918FC6C936 |
| 112 | 7 | | 5.3153 | A86AA75E4DEDFBD016E371DB21C9 |
| 113 | 7 | 7 | 4.8514 | 0B915E59AB611FFDD319B0C2E0E4A |
| 114 | 7 | | 4.4114 | 158990DCB2256F59EF7145947BE1E |
| 115 | 7 | | 4.8729 | 7F203675D7532E45308C1C2796B52 |
| 116 | 7 | | 4.3974 | 3F6045CB8F29851309CD56D1B45A0 |
| 117 | 7 | | 4.2832 | 1F62F9F1BB3F0430279C56552D30AD |
| 118 | 7 | | 4.5355 | 099F0E0362DF99884B985BED75D7AE |
| 119 | 7 | | 4.7235 | 2C56518B4E68C259FF9D8BFC0EBE2E |
| 120 | 7 | | 5.8632 | CEF38EAFF7203153C2FD2175264DA5 |
| 121 | 7 | | 4.4421 | 0BE168FD21975B1D913B5BFEE75419A |
| 122 | 7 | | 4.6368 | 3FFF28DB2C3DCAD54C7A3A4ACCCF81A |
| 123 | 8 | | 4.6897 | 1F70C89DD4D9078707EAB5A904C6109 |
| 124 | 8 | | 4.5277 | ACD623DACF045220A138791537604D7 |
| 125 | 8 | | 4.8285 | 0844AF5B49813C09264E0E9F5477CCE7 |
| 126 | 8 | | 5.0272 | 2228C017346E3E74A8179F90D4D36D35 |
| 127 | 8 | 7 | 4.8965 | 443DFCE10A622702A703694CAFA36D96 |
| 128 | 8 | | 4.7298 | 7F57F49B79963387C521278C9EF442A7 |
| 129 | 8 | | 4.6328 | 1E1E54F0AE35F71FD6666B66A9902B7C8 |
| 130 | 8 | | 4.8872 | 2F3C397FF4609489B8DC2D851641B9455 |
| 131 | 8 | 8 | 4.9627 | 76A76A09518DBAEE99F83EDF431CDE581 |
| 132 | 8 | | 4.3430 | E488D3AA62B27353FA683E43B295E7EF1 |
| 133 | 8 | | 4.6995 | 0D92B24722B25595491C6B1387C003DF3F |
| 134 | 8 | | 4.4380 | 055DA056840A5356C7F0E61379E4C0E7CD |
| 135 | 8 | | 4.5134 | 430D3E2DCCE1336972F2102558A2A87FA4 |
| 136 | 8 | | 4.4720 | 730F3124FF1350D6C48F8F960100D2AD54 |

TABLE 2-continued

Some results between L = 101 to 300, obtained from a random run

| L | PSL | PSL Rao | F | Hexadecimal form |
|---|---|---|---|---|
| *137 | 8 | 9 | 4.1088 | 1EBE3DB856B796DFF92620CF0CC8E4DE2AF |
| | 8 | | 4.2273 | 0599026FAC2D54ED7485C048707A219610E |
| 138 | 8 | | 4.3341 | 0613C9C3D1152AC7D322092F70775FF19E9 |
| 139 | 8 | 8 | 4.6602 | 0BFAA19133000D149EE962CA31F8B4C6B0B |
| 140 | 8 | | 4.6009 | 14C91EFAAB540B7216139806878A4878B9A |
| 141 | 9 | | 4.7929 | 1E092F47898B6A2CAB55989C9DE1187BE7FF |
| 142 | 8 | | 4.4789 | 27384E1D0AC4203368C05FA9BD149829ABAE |
| 143 | 8 | | 4.5584 | 398F073B238BA81F2448A1720927BED494A9 |
| 144 | 8 | | 4.2492 | FA1E6F892F08F2A5462989AC734123D31203 |
| 145 | 8 | | 4.4696 | 17E42BB84666E5B3E383424D0680C29AA59A7 |
| 146 | 8 | | 4.6239 | 336196CB1E2CE31A5A9D43A8BD9D950007C00 |
| 147 | 9 | | 5.3780 | 7254ED123896A60D3593189AB8106BAFE3FC0 |
| 148 | 8 | | 4.3703 | D1A1CFF74837787694056465C5B8A4A21340E |
| *149 | 8 | 9 | 4.5531 | 1415F0E18FE140712E75328421324CAC97B32B |
| 150 | 9 | | 4.4803 | 0A1C0078D7502AB3FA743D9CC44F594BDD24CD |
| 151 | 8 | 8 | 4.3663 | 6FB488568F32CADD641E1AB2F78FA777467711 |
| 152 | 9 | | 5.2509 | 208231DA2413C9E8FC89FC495336A9CBCF0B2A |
| 153 | 9 | | 4.8206 | 1750BB45D32C2AB082DF8180831BE7E6697B1A4 |
| 154 | 9 | | 4.7413 | 2B4402815E3027E47879684D8C662DF1545364B |
| 155 | 8 | | 4.2704 | 02DBA28BBE1CC149CEE3721E654EAA1604848A5 |
| 156 | 9 | | 4.5986 | 2276F919A0F4F152DD15498B483AD14633CE3FF |
| 157 | 9 | 8 | 4.6368 | 13BCC89691AF69EDF81CCE28550F183920BB2BA4 |
| 158 | 9 | | 4.9473 | 32ED143AD90CDC93B353FD6B79CF5105587E9AE0 |
| 159 | 9 | | 4.7396 | 78E320A0078C468BF390152F624DAA27734B6D13 |
| 160 | 9 | | 4.8780 | AD5A92659733AD2CBCEC260A2841E1FE239FC23 |
| 161 | 9 | | 4.7789 | 12331B84BDB7B40260CCB241E09172873D5552F18 |
| 162 | 9 | | 4.5674 | 00540AC0FE408BF2E8B03739CE69B2932B4F1C696 |
| 163 | 9 | 9 | 4.6760 | 3585E52CBD46F2F32BE31EA222044BDDB060FA2C3 |
| 164 | 9 | | 5.0367 | E85E957A353429F945968EFB404759E67E7B8ECEE |
| 165 | 9 | | 4.2834 | 1A3170699871AF2B360570ADABA8483F99E6F65B7D |
| 166 | 9 | | 4.5337 | 3CAE9C8BDB9F786DEACB526691035DF40F62D14CE2 |
| 167 | 9 | 8 | 4.6809 | 1C7F879E67D1AFE90806CDA537145D0851B89B9552 |
| 168 | 9 | | 4.6057 | 609F6CEEC7744DBB53AE6478548782C30B4BFA821B |
| 169 | 9 | | 4.7099 | 0C466755A02AE1ACA01C92B60E25C93EFF8F1F28325 |
| 170 | 9 | | 4.6598 | 1B6907DF2E0428551B3223A81B2ACA77398E1487A0C |
| 171 | 9 | | 4.4077 | 5F3C5C3C370189ACBF618CBB21DD4A90AD21A654424 |
| 172 | 9 | | 4.7685 | 1E7CD350F164741AD9AE652A2B45911803B18B7F104 |
| 173 | 9 | 9 | 4.7932 | 1B96A4ADDBF5FB30A074B2C1574F4532C07F0433A399 |
| 174 | 9 | | 4.6564 | 30F24FA47B129602434 14DD71ECC81BEF50239AB55CB |
| 175 | 9 | | 4.2832 | 69254BED3E8E1F84E30E4EFE316440B799D9AFAA36FB |
| 176 | 9 | | 4.2549 | 10F9CF566589BB4A0AA5DCB7BDBAB19BE1BAFD2CF40C |
| 177 | 9 | | 4.3416 | 154FD8B689BAE3BE56ACD25BEBC7C0C0BB8484DDEAE67 |
| 178 | 9 | | 4.1331 | 2C7EED76637297ECE1032CAE2DF5A64BC8A51883F9507 |
| 179 | 9 | 9 | 4.3287 | 07A40FBE21A31F27737996EDFDA6565D4150AA75CF2BC |
| 180 | 10 | | 4.7452 | 573E351CF59A8A0FDECBFD99B82CDB2B4A7483C87A439 |
| *181 | 9 | 10 | 4.5832 | 1B079F428BA1567E8D08F5DF157C6731BFB3DAD6961124 |
| 182 | 10 | | 4.6746 | 267AA9909DD20A28E96B2E5B5FE7344F0277BC7AF03966 |
| 183 | 10 | | 4.4309 | 198711D33271F44913FF7E18A8C05E205AC172DB58A4A5 |
| 184 | 10 | | 4.6814 | 680D4A8B927690884FC0C9FAADE8504D373970F1C779E6 |
| 185 | 10 | | 4.5464 | 052E5A06E24C46E087B31D55FED1E72489877FA1C4B47E9 |
| 186 | 10 | | 4.6239 | 14A5EEA662200CA4336A8E1C905922FD612CF3CC83F05C3 |
| 187 | 10 | | 4.5285 | 2DDA5535CDF3DFE2DD190C9E03D9994B8B424E7EE2851FB |
| 188 | 10 | | 4.7176 | 74509B5F48E09E6EE2AD314A66E2B9C4B102F5A3FFBE3E7 |
| 189 | 10 | | 4.8090 | 1D1A5428AD626FCD160C272059DDD805B7D40700E18C580DA |
| 190 | 10 | | 4.4645 | 17312DBDAEBB8A2F664B97FD21C22F33F67D0786AB541818 |
| 191 | 10 | 9 | 4.5522 | 04EFEC46D0E6FB25F1AC14362E0DF8D57156087114C94BB0 |
| 192 | 10 | | 4.7950 | A2D079EE30185FA85DE64678B2E9C19B13D2B6991A01A029 |
| 193 | 10 | 10 | 4.5205 | 0356A8D9D62999F613EDB6C0D684E0206786A28A3BF85C4C0 |
| 194 | 10 | | 4.4288 | 08A6999A3325EA3714386A2B7180F14F120BD38049EDEFF96 |
| 195 | 10 | | 4.2316 | 19126AB6BEA9F76BA4C1EF07E0D2EA584FD8A9CEC62B6E71C |
| 196 | 10 | | 4.3048 | 3C2FD50D00D44A1C64496B6D8B0EFA8C6FE4D8B19165E23BB |
| 197 | 10 | 10 | 4.6267 | 1016AEDCF5EC0CA1E841D7552F457FB4C9B79F678CC6D363BD |
| 198 | 10 | | 4.5052 | 2A88EAFC16C7B4A411788BF5B798BC4836B44A1840C9C931E2 |
| 199 | 10 | 10 | 4.4889 | 4B1A9382A18BB9FD5C60A10F74A00CEC3180F5126F41EDB64D |
| 200 | 10 | | 4.5496 | A52DE56BB6911EE34183B1D910608C43D13FAE13A13E745544 |
| 201 | 10 | | 4.0080 | 0DFAFD351B1F0E2A322A74A30A7B90B7E40CA194D63ACFD2669 |
| 202 | 10 | | 4.3033 | 15768E01358C821A3C140465C3FED9225B40BD8833A71BB53B8 |
| 203 | 10 | | 4.3033 | 37AD5210DEFB193936EE1F2325802C852AAA2FC3187D9079A5C |
| 204 | 10 | | 4.2310 | 926DB5FAA7AD71A4A1931A91C3B902260739C8F800F5751C4D0 |
| 205 | 10 | | 4.7050 | 04C2AABB65964BDDF6031603DE449C948489DE43C1E942851C31 |
| 206 | 10 | | 4.1288 | 397D85973B7D04F776B6868BBC5DE72C47658A47820324793B5E |

TABLE 2-continued

Some results between L = 101 to 300, obtained from a random run

| L | PSL | PSL Rao | F | Hexadecimal form |
|---|---|---|---|---|
| 207 | 10 | | 4.1886 | 45 8303A80984E57076E2EF16C36 9EC4097893F6D5308455E1957 |
| 208 | 10 | | 4.3126 | 71 D8BCA7635D21AA1FA1A5C6E94 4EF2BA642EE8040C01EDD3061 |
| 209 | 10 | | 4.3542 | 0A2 7A2D520642791E4A288B3637B 2087A14F58C55EFE347CFD850 |
| 210 | 10 | | 4.6392 | 3D0 7247DFBC2FCBFDE1AB159A9B9 CD50C3592C5F7C4B3C9856314 |
| 211 | 11 | 10 | 4.7232 | 198 52A37233C2D43B8342AEFB082 77C51F725992CF95C520A0905 |
| 212 | 10 | | 4.3567 | AF1 CB148B2DB2B65156F3963680C 6EF237EFF9B217F1A3E079D8A |
| 213 | 10 | | 4.5170 | 04BC 54B6C279762DD879E85E962C0 DD988D773D8D7C754428EFFFE |
| 214 | 11 | | 4.4111 | 1FAF C3E2D7BF438E6D8CE930B201B C2F6A6D73826E6B3175C2157D |
| 215 | 11 | | 4.8403 | 64C2 B8E6391E1E11937E4A47CD576 F1ABDC04E05581AD4D24DA484 |
| 216 | 11 | | 4.5385 | 48DF 4BD90B88B72621D593219FCDB 5F95E02870D1580C35C257880 |
| 217 | 11 | | 4.6715 | 1CB0A 9A24DCF0354126D55021A2DD0 85789C90FEDE7BDC1C81988E7 |
| 218 | 11 | | 4.5029 | 031A9 53C3F0B70F512110CAE3BBB66 04CFF6D4B1F6937D117DA9945 |
| 219 | 11 | | 4.7647 | 5AD2B A7BE8FAB6F816BC793366EA47 07D068A62E773989779AFDC02 |
| 220 | 11 | | 4.3888 | C368C 71802FC345B687BFA34199FC4 F96EA4346BD7CE66E8DAC9EAA |
| 221 | 11 | | 4.3192 | 0BB2DD C74432198B005C9AB0423CB43 72366437DAC31A15077B45F14 |
| 222 | 11 | | 4.5273 | 3ADC4C 6C46E38C7094E8FF9552FB26F EADBFCD1234DE0D53F6C49783 |
| 223 | 11 | 10 | 4.5216 | 46B8CE B7A9545D25BD89F37E75809FF 7772BB3038782C30C197A6997 |
| 224 | 11 | | 4.2009 | 090F47 3C17A42C3BF5E89CEB2BBA7E6 84DD6272F33F7F22A4D166186 |
| 225 | 11 | | 4.6462 | 0F3F080 960C003CEC2B3628DE13AF24D 02EB37E14A4CE5D58D51EE8E6 |
| 226 | 11 | | 4.5990 | 08F7EC2 358BCDE176C9455054ACE5048 A2168F5B599A38F803247686F |
| 227 | 11 | 10 | 4.3899 | 4BDB6BB B99B1287F6ED7290E07981755 5ABE0DBCD3A1E60C31CF80576 |
| 228 | 11 | | 4.6365 | 1171615 9828388A9652829FFA130DAFC 6976228B0CF3CEE59A81F8172 |
| 229 | 11 | 11 | 4.5664 | 1FB417C1 0FA5834140572D8C6B38450A6 59D3C54A7E2C40EEA660F99B0 |
| 230 | 11 | | 4.5299 | 070B2A15 10BB7DF8973BB7EC9388F2B2F E2E6B6035DC16BCBB84A47906 |
| 231 | 11 | | 4.5819 | 61FEE277 96F38A954A0976C262D0D9F26 606344364AD2FC2181D15455B |
| 232 | 11 | | 4.4556 | 63D6DD11 06ECAB0CFE5A68AD21DCB8D9B FDE3E6C07ED23A9442E2F73F8 |
| 233 | 11 | 11 | 4.5423 | 09E993054 BB2E36746A6C3843035044231 D4B85753BC0F884BE437F5901 |
| 234 | 11 | | 4.3122 | 3F83FCEE4 8701A329258336DA9E64304AD DA7942838971518D5558813BC |
| 235 | 11 | | 4.4529 | 6FDCEF49D AD916CB37840D43AAA795F25E 4930A3C72ED48776371F5011F |
| 236 | 11 | | 4.3418 | 76B3EABB8 1A847C4DA6B6D204C68407E30 5CC22FD9F148372B64587284C |
| 237 | 11 | | 4.3488 | 1B6F29F90C 608FDC6E618E1108B60323724 EB6C58363F5E8545553E4868F |
| 238 | 11 | | 4.6992 | 06EAD42CD7 AFCDC47B1EF4DF1236319AF5F 4EAF0C5B411525A6C2DF9411F |
| *239 | 11 | 12 | 4.5457 | 7AA8918194 FAFD27B4515ECE1CF274F5D83 5581EA19C84A1FB1245E76981 |
| 240 | 12 | | 4.6332 | AD24A86568 A78F9878774C509B98EC0DED4 6D48FC2419100EF31144B06F7 |
| *241 | 11 | 12 | 4.3921 | 030D7CE8ECF 18D184F798C6E925B5704AF4D A2153A769D9074480E80E002B |
| | 11 | | 4.1797 | 17EEA0FDFD3 38376725F7255EC9160C1405C A47CA7B2CE21A59D4E64250E3 |
| 242 | 11 | | 4.3464 | 3A452CF3DC2 89C379144C0E8BA92E4B808CE D496E69311012B053F30E9D7E |
| 243 | 11 | | 4.6415 | 35C9D9FAFFB 96A551B71C8390A37759CC45F 484156FA82F926B26887C70F2 |
| 244 | 11 | | 4.2224 | 5C8AF0D5BF9 D541F6B82C8DE3C6A18267037 AFC92FDDAFB632C94B3DE26F6 |
| 245 | 11 | | 4.3994 | 029CCAFFEDB3 109A073885E8E81FE68305F54 D0A3A741B0B163E2925AB33A5 |
| 246 | 11 | | 4.4980 | 1EF242563567 E4FE52FF00D8EF33CBCD77E15 76F0C1098B36CD62E154F3BAA |
| 247 | 12 | | 4.5975 | 680050117ADF 24B3EB0D676181E972AC07F14 C51C57B2455CAC6CE3E657833 |
| 248 | 11 | | 4.4414 | E721F0BD8B58 2CEDF5730F2FE3147225DD445 8008182C9DF924BAD460DD581 |
| 249 | 12 | | 4.5940 | 149895B3E2941 61BB5E2691A6555335B90F11E 48FD877580D3C261A7FA8CEFF |
| 250 | 12 | | 4.4560 | 2A37BF6AACD9B 65333BE4542328F68AD3840D2 8A97E21C77B7827A103F0F1C0 |
| 251 | 11 | 11 | 4.7291 | 6DB7A22D9933A C0168A3171654A6CF1F8D0AAF 7B9485F179D73F919E19C17DF |
| 252 | 11 | | 4.0020 | FAC07D4D1E117 B4E1677CC923412105413BBAF 205A3373BC454AE4E34DA35E3 |
| 253 | 12 | | 4.7163 | 0B0B99CDB21AB6 94CC3F2887D7B83036A9F8965 07976154B800C000C7B4CB986 |
| 254 | 12 | | 4.5440 | 3FDC4870527391 C0A10C3348A5FE518A2C5B82C DAB91F0D6927A426457D03B72 |
| 255 | 12 | | 4.5902 | 21234DBAD3F352 6E8501E19ED0B66077A6F2563 99C6293D902818A2AA03B3D10 |

TABLE 2-continued

Some results between L = 101 to 300, obtained from a random run

| L | PSL | PSL Rao | F | Hexadecimal form |
|---|---|---|---|---|
| 256 | 12 | | 4.8075 | C66E72E53E702C DE4A16F649491AAA790FE155D 07F7FCDD00CD3B2D1C7E7EEBD |
| 257 | 12 | 12 | 4.8338 | 005288A05F7398A 14DF4441798F8B49B3667832 30292F30CBC295A2B7C6AF90B |
| 258 | 12 | | 4.3421 | 12FFAA7F6EBE859 30B776153844C33C4B98FD1C5 1F1B8A5C19464B69723B58879 |
| 259 | 12 | | 4.3396 | 0E9299B96C6467F EB2BEAA619253E4361C063507 C4BB06DD80820F18E55A2A5D6 |
| 260 | 12 | | 4.6492 | 3251DD64471D3FD C39A0D21300321D834F0A9743 B65AB60D44F9D6362EE1057B3 |
| 261 | 11 | | 4.2672 | 14BC454E90DBA496 2C47443AAC52565A717174C59 62CCCE4B8021C8FF79F0BFFE0 |
| 262 | 12 | | 4.4557 | 398EAAE6A915AD58 529B8310D39A097DFEEDF926F 7483B0FCF6F8E4C3B936F2278 |
| 263 | 12 | 12 | 4.3344 | 4FF9990608130226 479E4F03723535A5B15359542 FFA0F358B68B579EF051E71AB |
| 264 | 12 | | 4.6814 | 9C6DDF143C077B17 F4734C3A7EA9E3E9ED1809CC6 8162ADCA48DF512AAD04DBDAC |
| 265 | 12 | | 4.6007 | 08EAD88E9392BA6D9 6DA7383814819FA67BDB996FC 1BFDCF4447BEA74ABE2C1D5E8 |
| 266 | 12 | | 4.3118 | 31E2917C735D17D56 B82FF294FBD41AC9886129D19 3CBCB3E467268890373729081 |
| 267 | 11 | | 4.2652 | 5953B8519D5AF3326 5E8E8F6FAF6132E431B1EF8E7 FB862D2B61B4104B2FA0F8053 |
| 268 | 12 | | 4.5912 | CAC8A6B8FF1404596 F16F1D0CC409087C0A547B697 32F1E348DB642BF11D722ACDC |
| 269 | 12 | 12 | 4.5903 | 0A28FD2E951E47AD41 4AF7B8C6D698458B626F3CF48 B2120F883A3010D9B2EE26727 |
| 270 | 12 | | 4.3836 | 3FB24A8175445D1BB7 C06D440EB73C93289BD73E9E6 D6FEE56E3D0C6C6B47B8E243F |
| 271 | 12 | 12 | 4.5028 | 37C39615AF6E13408F 3588BEAF3D5489C300D976626 EB64ADF7B3E0BCCAAFA6F61CF |
| 272 | 12 | | 4.8267 | 6C7B85DE551BF08A6B A18C345823177B5F330F135DE AF745BF938D0FC694B4BB3F64 |
| 273 | 12 | | 4.4617 | 0A93D1616BF17B44A52 F8CE619CB008B3C7FF649E3DA 1C46C6063649E0055503444E8 |
| 274 | 12 | | 4.4683 | 27408228CFAA388F25E 578392D64A2C34EDD9960B2C0 BD707BC42A37B13533F9DAD7F |
| 275 | 12 | | 4.3881 | 63C00D35432AE2D07DD 1C97957581650E3C2E42627FF 1B6E8D642A57BD66F39DF620D |
| 276 | 12 | | 4.5032 | E7979B9C2CAD25005A7 8250229573D322E8926478D40 FD8DF098A6A20EF4CBB3C8668 |
| 277 | 12 | 12 | 4.4352 | 09E400E0C161B9B53D99 5C46D0FCAC99D6A2ABC9FC336 FF186A63FAEF1422D7AA5CB3C |
| 278 | 12 | | 4.5790 | 2983D92E3BC584B0B25C 8EF00D7AE6E82B0A5EFFCF47E F4A4330DDD2895725174EAE4E |
| 279 | 12 | | 4.3192 | 472EE8D41894A158C233 97B9C4D0F60BD024053C903CD 98404E8D9EA497C924F74F5D5 |
| 280 | 12 | | 4.2535 | AA6A5AD2B143072C7EB6 FACC08A4E6372094623FCC11F E7D14F9B6B8F516EE0BA3C360 |
| *281 | 12 | 13 | 4.2325 | 1250B4B5611E8A70A14E0 029B6C2FBC3CACD455008C9EE 64823558B71DE7D170667ECCD |
| 282 | 12 | | 4.4273 | 0730D195C56AB2B8EAD3C 87A62ADF9BB7CA20F40C203FD A0110F2ECC5A4CE865C842C85 |
| 283 | 12 | 12 | 4.4747 | 1D7F0AF6BC0D0B140051D 561F00D0B349B923F742304EB 3B414B231998E9865147BA49E |
| 284 | 13 | | 4.3541 | D6659E57605A0D8A84088 28AC3B7913AF398096F878D0D 789E588226F055F88D92225BD |
| 285 | 12 | | 4.3735 | 184FEF1665B368529D2C82 90CBFF2376484A77472BAB2A6 550C3507E03441C1C35148877 |
| 286 | 12 | | 4.3830 | 09D8AEB8A1D5B720AF0EB3 3ADB4CFFB7537B97758B14A4C F808F1A9DE7A4CD0090FF361F |
| 287 | 12 | | 4.1706 | 5864B95DB71C461D0C2D77 64F462406B4234868C55E4AAB 21B9E05E2704D01EF5C29B3EF |
| 288 | 12 | | 4.3858 | F7690297DED44B34F5BB4B CE683CE9ADBBE399B0620F0C1 F33251F83B88BBB0D554AA11E |
| 289 | 12 | | 4.2981 | 0E19848BE384366860DCC64 03A970452A0771277C12F4CEF 5A426AEDB5F150D44081DB67D |
| 290 | 13 | | 4.5622 | 003DE0169C79C436192C860 1178171966EDF2D770488BC1C B3F2E213153B95F8B92B695AA |
| 291 | 13 | | 4.5621 | 206FFE4AA9297C4625E9AC5 C134A1ECD978C0D95C8947A64 773BC470C2C02F08300571D56 |
| 292 | 13 | | 4.6410 | D4D94856B076680ED4C83BA E0389F6EA37561A969BE68D09 1E7AF95981EC2382BE7BF75B3 |
| 293 | 13 | 13 | 4.7599 | 1029280A08AC82FE48A56B5D F3E49084CBE0F4BCC6BC4D509 8FAA35173B7448CB974338F9C |
| 294 | 13 | | 4.3961 | 244EB3EFDD33162F72EE399C D55D00DD65F8532F1408FBC3F 4DE2DAD3C3C9C048A3595AC8F |
| 295 | 13 | | 4.3361 | 42B8012C2AA38EEAF56E7580 EA0598DEDC0121629D93CC029 C5996C096FE64C79E8F37074B |
| 296 | 12 | | 4.3203 | F41C6C21538021B8E1792641 732B13207A97F373C94C2D710 854FD5608FB27364FBCEBAC91 |
| 297 | 12 | | 4.2953 | 0BFAE9E38FA87671109C805E0 8EFF9F42764E4385F3A255273 50760A835665C96A4082DB659 |
| 298 | 13 | | 4.5771 | 25C65CB1C766535BE5843B56D 9C843BF83698C284C37F1B1A9 300541600BAA5C2A1FC55F899 |
| 299 | 13 | | 4.4166 | 5EBB52FEB5DEB2AFCD1AA60B3 566DBE0CA61DDED7C22623611 C53F727860FA230BA0F067ED4 |
| 300 | 13 | | 4.4074 | 5AAAF7F284E43542CCFFD096B A42E7C784BA0BA6E9CC7DE4FC 5E34433349D60837235C11164 |

TABLE 3

Some results between L = 353 to 1019, obtained from three random runs

| L | PSL | PSL Rao | F | Hexadecimal form |
|---|---|---|---|---|
| *353 | 14 | 15 | 4.2075 | 1AB8EE1405CBAA 2301CE6AF55A9367F56F975F0 F8237A4B217DED35D90E5816E 94F1ECC71B333DBBDA5036461 |

TABLE 3-continued

Some results between L = 353 to 1019, obtained from three random runs

| L | PSL | PSL Rao | F | Hexadecimal form |
|---|---|---|---|---|
|  | 14 | 15 | 4.1826 | 0BC99EBD89BF14 90732179CF81A885214CE20B5 1229FCDD9602A4B8EC90446B8 62243F8D2EB37F01C754B0D0D |
|  | 14 | 15 | 3.9888 | 13777D08D9CCB7 7FB0682F94B34955C7ABA6DF7 A4382E28730A8FD2158C588B5 8E9E95F3C0FC35ECA3AEE4998 |
| 400 | 15 |  | 3.9154 | 162AA2BF4624EF3267C40966D 41249C78F32FB952F854A6E16 1801C8A1951066525F898051A 5D0FD7CFC24C534A633BCCF11 |
| 449 | 16 | 16 | 3.9536 | 1E0390E174209 BF08169D833F3FFECF225205C 063B40D2815C99DA20C39B28C 43D64E92D4FA7550D6B3FB272 51CDDD7965371671AAAB51F86 |
| 500 | 18 |  | 4.1809 | EF9CEFA1E5BB859636F0247B7 0CF943BBCA41A7A40E7076EAB FFCFFB2E4A11B2FD1F9531994 91976D2C06ADBB1B146459BE9 04A355B1EA54714F3B8382F94 |
| 547 | 18 | 18 | 4.3408 | 1A11223446FA6 B24D0058AF50DF76297DFB4DD 1FD629835796CABBA9E7B960D DF0ADAA3EF781CC68787065EE 84E33C3EC2F328FCA7FB90948 5ECE5C52EA75E8B38528EC9D0 |
| 600 | 19 |  | 3.6753 | 947D1CA2F0D6605BFE64A83D0 DE36DF1124823FB586FB3D62B EAA03228D4E4A8600B1C1B84B B75345932030798EAD7362F79 B956E53BC32227E2EEE501921 3196948FD9B4E8C7CEFE1C32C |
| 653 | 20 | 20 | 4.2287 | 0042DAE58D12B9 D67C18A56FB5FC1A3CC9F0D0D E5EB1EC464C10E86AE5F94159 2BBF8ADF8E5BD87B4AF88DAC6 33B1053BEDE8D1677832775DB 472499DDC0F47108524DA7AA9 1FABE45FE5104544488DD51AE |
| 700 | 22 |  | 4.1524 | 755D7F2A5202805BA539F3368 3185FD0232E2CDC92725588DE 5ECEBB4381929896E01781621 779C512CD67B61D874F3AD782 8A1A5E43440216E1292CD9A0C 9358146E7624EE7555C3B9471 F04C2F9FDE6D1E15DAC0E7DC1 |
| 751 | 22 | 21 | 4.1537 | 61831AE4D5773 3A33AAE6785AB1421C2C70402 F98BFFB1D3F4C557F60DAE504 848FA28617F2A0F967C82304C DFB3B856C8EBD8BEAD682F05A E8449FC6C21C355B97C8294A3 875DBDFF3D6C9A56D62DE43F7 6EF61E8F9CD3510C86F4DE665 |
| 800 | 23 |  | 3.7481 | 9BD821BDB337C783D2FABFCF8 BE46CCBF2B4D8E87BE39B4DAB 43CBDE96919EF1DCE0A34E45D 85C49DB1EA102F744E437B80C BE718414F3AC82113DF1FEFD5 FF9AE0245D10A97D94CDD048A 336B9745A0AE9821FAAF92E12 FD477533B32E90AD5BEAA5A46 |
| 853 | 24 | 22 | 4.0854 | 02768D10E7D43B B00F7D393A61C6F78AC926759 4B7F6C536B2553B581B4E1FC9 9553236F6CCC5A7710BF4B20E F382C7274E1222AD3E6676769 2719CBC8E037D5C80151FB719 E3808E0F4D84AF5392E81F508 B2AF69DFD57C1F4DD3F95EB3A 9DFEBF2936C2040261E51D1C3 |
| 900 | 25 |  | 3.7623 | D3B8E76EBC7A737A3A210F4E4 47E066618EB529E7F468B8F7C 6C98B68A16646A51508853AF5 24A01FCA8A1A85EF8DB3E4792 3EA2F5667ECFC0816743B9379 12DB00B6508585107D1AA082A C3A9BA4E16218D792490B0CAE 585B7EE11EDD201121BB05F5D C63B889EAEC44169AC775B6DC |
| 953 | 25 | 25 | 3.8493 | 1AC865E34EECA7 6F31F9C2ACB1F520F3522FF35 1D7D58F75D848C3381CDF3F17 65B5CB15C722C43DA7EE6E1EA 06B6DF1820F42FADEA195F3E8 A56CC703346B757F1886E0DB8 42F19F293A2C8A0C31AD9B0A7 DFD801181F997A767A026899A EDB73DA9BCBF86FDCAAD48083 50D45A040A2E218999BD5536B |
| 1000 | 27 |  | 3.7568 | 66F3B7F4A3B3768250162B9CE F30B4B45FAF0F058360426D04 A75FE02F29C09D407C02A9CCD A6E531220913CDA82864F2D1C A84E1C1A785237775D881ACE7 87ECDE9FE1B0478698D00E58C 0D59A19B489913D6768D0EFC7 2698A4BACAEA54F4444E70932 F51352443D57DE0BD533D922A 47440DF545402CE0269DCEB79 |
| 1019 | 26 | 24 | 4.1390 | 5DF5B 7DB1608F87A6C00E33A6AAE88 2F273C56FCFD5242F0A60D974 CEBE75733A782AC3F6687CC4E 53EC18BA1E7EA820C84B2A1CC 4742E4ADE9C89A72E36A44130 2F26315A438C72E2955B0C5AA 16C90DFFD00BD37A813852651 A95FDFC4A371F0EBF4341AC6F F5DEF996611CC12E2B2DC4200 DAC88AB44E44D26252FA9F789 |

Tables II and III above thus illustrate application of the embodiments described herein for some lengths between 100 to 1019, for the best PSL case using the fitness function $f_3$. To reduce the computation time given the large lengths, the population and children sizes were decreased, and set to $P=2L$, $O=4L$, $G_{RS}=5$, $G_{max}=100$, $P_{RS}=2L$. For some prime lengths, the PSLs obtained from K. V. Rao, V. U. Reddy, "Biphase sequence generation with low sidelobe autocorrelation function," IEEE Trans. Aerospace Electron. Syst., 22(2), March 1986, 128-133 are also listed for comparison ("Rao"). It is shown for those prime lengths simulated, the PSL obtained by the embodiments described herein are close to those obtained for Legendre sequences. At L=353, the obtained PSL is 14, which is better than that for the Legendre sequence at the same length. Between L=1024 to L=4096 (not shown), the embodiments herein perform better than many conventional systems, and it is easy to generate Legendre or extended Legendre sequences. For instance, these sequences can be used as the initial population for the proposed algorithm and better results can be also shown that the PSL of sequences obtained by the embodiments herein attain a lower level.

Table 4 below illustrates further application of the embodiments described herein for some lengths between 1024 to 4096. For some lengths below, the PSLs obtained from A. Dzvonkovskaya and H. Rohling, "Long binary phase codes with good auto-correlation properties," in Proceedings of 2008 International Radar Symposium, Wroclaw, May 2008, pp. 1-4 are also listed for comparison ("Dzvonkovskaya").

TABLE 4

Some results between L = 1024 to 4096

| L | SL | PSL in Dzvonkovskaya | F | Hexadecimal form |
|---|---|---|---|---|
| 1024 | 29 | 30 | 3.3997 | CFA46D 7C7EE057BBC96DC358EF93A4D 4AE2F1B85AEE7FD78A8E2E72F 8ED04FB06C2810CC858110AEC C0E7FC611BA8FAF34444595FF 4566617B36A5FFF32D0F39292 940992AE8BB12F1E37D8C6250 53A129BEF2DDE3E6D801F13A7 0E7104C6448AF94CA83D8B799 56A1386B04DF36D1465821096 96E9E4BF16134AB81A7F4B2F1 |
| 1500 | 39 | 40 | 2.8603 | E5EF946A41674BD4251752B9F C3B3A12BEA9720B291933F5F0 86FE1BD1CD328E985F0C7707E C6071E6854B45BC6A693D483E 1C4EDA0A6D50B7DE18A244EEF 29CCC4CD1237AB819A7D883EC 65D7D55B8C552EC406219B4BC D115BF0B4722A8493BF5BE764 8C4AD81A1CFD876D4AA7BFAC2 A365A5C93F4B88A86105AECDA D364024B98E0D84FBA780383F 973478B586E544EF74EF6E7B9 C8F64836C3ADE18022084514C A7DCAC0F597332FF825301954 C437B068534D2A0B21840E2C4 |
| 2000 | 43 | 44 | 3.0220 | 71E9C4BD254F5EB3F0B3DBCA2 41E8DBEF75282D49DC2FA957D 433E3EEAA4163E287E915DE5E 9AB8371F6EA55189CE81E50E5 247BDA4138AC377D6C3F42671 2EC0B2427DDE19B361BF2F3B6 0D3FA93CDD16B6819DEEBE843 E0CBF37F50A3CB9FADA4D359D 268FEB247EC469AFEAC9FB044 3363CF7264DE462673AE66DF8 62EC1241846CF59C59B713891 2C77856124A3BF020EBB062B3 DFE0203A22AA456223958ABBF C774E96472C5706B15F2B3520 EDC5BB5F52AF07A4EA36BBD29 94CD43104300F40E4DB42635D C1147A94BD17EF2CFEF9BDEA0 C076D9E55D9473435525A1CC2 D0339A5F5B00FD8B934C4DCCF 0213DE6C454CB1A5879829938 |
| 2048 | 43 | 44 | 3.2061 | 1E148B419D5E 7633EC1DE94D724A0F6C859DC 4B79CC1EA4C790556649EB699 8F3EFA39333DD2427B8B46B6D 949DDFD1CC5782F1FB0DDE1B9 16904011F7CFFB9020B1F4DDA 710C50CCF59831400F07FECDB A4238F39CECCD68A56180A4B1 7F407F4F882AD780E2A60D15D 61D3C7AC7761FF52647DF2421 513D04028D55B0B898F22A236 0D4641D71F0A49FEF16442CBF 300C4D1039EA07451FCE02528 A180A5897A263AEFBF0DA56B7 8D1362EF8B960F279E9987CBA ECBD1CDBEB9C76429FD34395A 93812B149A84C442D222678C1 71B15A03EA16E7329B4049E70 0E569F5DD4DAA154A3DF4DD09 C55ACAC824615401A8034B8D7 C05CB82D33E69152FF1CA4990 |
| 2197 | 46 | 47 | 3.1690 | 0138F9B11F455F3AFF864B662 3AE0E0C66C0C82CA63A1463B4 9EDAE09BE9A103E8DF55314FC |

TABLE 4-continued

Some results between L = 1024 to 4096

| L | SL | PSL in Dzvonkovskaya | F | Hexadecimal form |
|---|---|---|---|---|
| | | | | 3762BE8547A8334052A3B9CA4 |
| | | | | 0BFC4AF8213CAC16E8F1C2253 |
| | | | | 03177CFA685E250782B38C8E1 |
| | | | | 305820226DE60792C2E840DDE |
| | | | | 2C47E9216368E70A504EFC3C4 |
| | | | | 08A63B9E3B0AE7DB11E0AA47D |
| | | | | C7A53874876E5D68F51ABAC89 |
| | | | | 14A3B4EE4449C0B3A544DD450 |
| | | | | 29132148E4E208A8AB137FADD |
| | | | | D2F138DDE10ECEC0D076A7404 |
| | | | | B27797BAC13D369F2656E9BF8 |
| | | | | 24675973B97386BDCF1E77148 |
| | | | | 10B2D7B217A7ACFE5BBD20193 |
| | | | | 3B9F5B49466BBACAFE804180C |
| | | | | C7B26FE78BDFC909A06AC82F2 |
| | | | | 5C364FD0230A80A0857C99D25 |
| | | | | AB4B113EEBDE92D7D9A065E22 |
| | | | | 1673DADE9B58DC53C14116E20 |
| | | | | C815D7360DB84C2C67425984A |
| 3000 | 53 | 58 | 3.2162 | E9F455C19481DBF43FB939BE4 |
| | | | | A58E6F5A14867CEA4564AA633 |
| | | | | 1BC931A37735B9992FDD80101 |
| | | | | AACDA89F5C1505BE94726AE4B |
| | | | | 19A7D935D6EDAD05B547E041A |
| | | | | 778E25B190098A710B992FEA2 |
| | | | | F9C17131DA4469A7B7F65AB91 |
| | | | | 93117B40EB21CDDBAE2DF9245 |
| | | | | 49F8B81E09E6FA3FB70884DFA |
| | | | | C705E820D168F09675AA19714 |
| | | | | 1EAA7460007C635CB6073D745 |
| | | | | BBD2C1CE8B36B72B272B2C728 |
| | | | | C6EAB4B5E874D225C7D8FDB99 |
| | | | | FE12989755A19F3C3833976DD |
| | | | | FBF088312AFCE6861A80CAB71 |
| | | | | D2FE58092B856B005A82CB8A0 |
| | | | | 612C4BB02C25AE82DDF9F6FDE |
| | | | | 21EDCEDBB26E99E9D8545CC29 |
| | | | | 8BDBB9A055290ABD2CBC56463 |
| | | | | 119592BC3BC1C7B66E99388F5 |
| | | | | BDA0C06757322386D49FC45DB |
| | | | | 87008F9663684A7A93E043DBD |
| | | | | 06D4A64D710E671B5648E23EC |
| | | | | 3E4A1A9FE0FE01A69EA40C702 |
| | | | | 04D1E21FD5F4DDAE9CB751E79 |
| | | | | 835531CCAA0D9B77A1F12C37E |
| | | | | 6FF65F69CE41FBCBB33A7EEDB |
| | | | | E88A842437D4769EFF033D6C4 |
| | | | | AF9F3B6E3E9622EE341333B35 |
| | | | | 5F5AFD1A9FAC66B114995E073 |
| 4096 | 67 | 68 | 2.8608 | 78E67492E26B70A6E7D7FF2A |
| | | | | 5F1232DD35148D07FF99024A8 |
| | | | | 5525DF7FA009A436130572218 |
| | | | | 99F41A814C60B949FD19FCB25 |
| | | | | 68A0F5DAB0705664740AD985F |
| | | | | 0800DB8F0456CC199005B396A |
| | | | | 135C9F90EFB40D3ECE8012B7A |
| | | | | 7B5EAFCF8C8F5C7C509C9A7C3 |
| | | | | ECBDB95F84D3A04EDC166112B |
| | | | | 9C5585F878FDB1946F1131D06 |
| | | | | 6CDF481D1E66782CB75A05EDA |
| | | | | 4D0DFCFF826EC78AFBA61B768 |
| | | | | 3493D5546D3A92A7DC4FB278A |
| | | | | 02C7337A7BDD771AEE09A3F56 |
| | | | | 29DF5BFC82956D70BE32A3974 |
| | | | | 431CC565CB4039CE0AAF808BA |
| | | | | E554C37516048C079BEAB5495 |
| | | | | 15947AE56BA1546ACAB1B010B |
| | | | | E1683A450C36B730912F14CFD |
| | | | | 79B23BA9ED7C8CD13A45665B5 |
| | | | | 2F1F3AA6C0516BC67E1C662AF |
| | | | | 6F812D8E93B27ACAE862AB277 |
| | | | | B0451857D611137624E155439 |
| | | | | 44EE8918D0E40B1AF834B5E48 |
| | | | | 829C8EA9D995599A8284A2B83 |
| | | | | 2041F894B5315FE1FF0F0EAC1 |
| | | | | F1A83E723004D249176BB01DB |

TABLE 4-continued

Some results between L = 1024 to 4096

| L | SL | PSL in Dzvonkovskaya | F | Hexadecimal form |
|---|----|----|---|---|
|  |  |  |  | 000C2422731310E9D63475C59 |
|  |  |  |  | D7D8B7D83B53CB94B06E86E64 |
|  |  |  |  | 99569053A32F91C4437A737E7 |
|  |  |  |  | 2F11B1FCA6A1D368BB1AC9382 |
|  |  |  |  | 86348C0FAE77B0C366C616204 |
|  |  |  |  | 43A57AD4B5E23604D63CC8A01 |
|  |  |  |  | 621F9607FB514BE7E9152A13C |
|  |  |  |  | E7C9693CFCA5A244360DD6F16 |
|  |  |  |  | 5B8E7C729093DC21C91AEEFB4 |
|  |  |  |  | E509679C83012018356DB3A04 |
|  |  |  |  | FD7CEA96703D213C1F82998D1 |
|  |  |  |  | E252957C6DC67BFE3C4B645DE |
|  |  |  |  | 9C3E82194C1C732E3D672FD6B |
|  |  |  |  | 22F67F613A4CAD922A3881208 |

In this regard, the various embodiments herein employ a semidefinite programming approach incorporating with an EA algorithm for searching binary sequences for low peak sidelobe levels. This decreases the peak sidelobe levels that can be achieved for binary sequences without the use of exhaustive search due to limited computation constraints.

As mentioned, at some prime lengths, the various embodiments herein can find sequences whose peak sidelobe levels are close to those of the Legendre sequences of the same length, and at some prime lengths, can find sequences having better suboptimal or even optimal solutions. These sequences with low peak sidelobe level are applicable to environments where relative delays between signals can be arbitrary in transmission such as Asynchronous Spread Spectrum (A-SS) systems.

Figure 6:
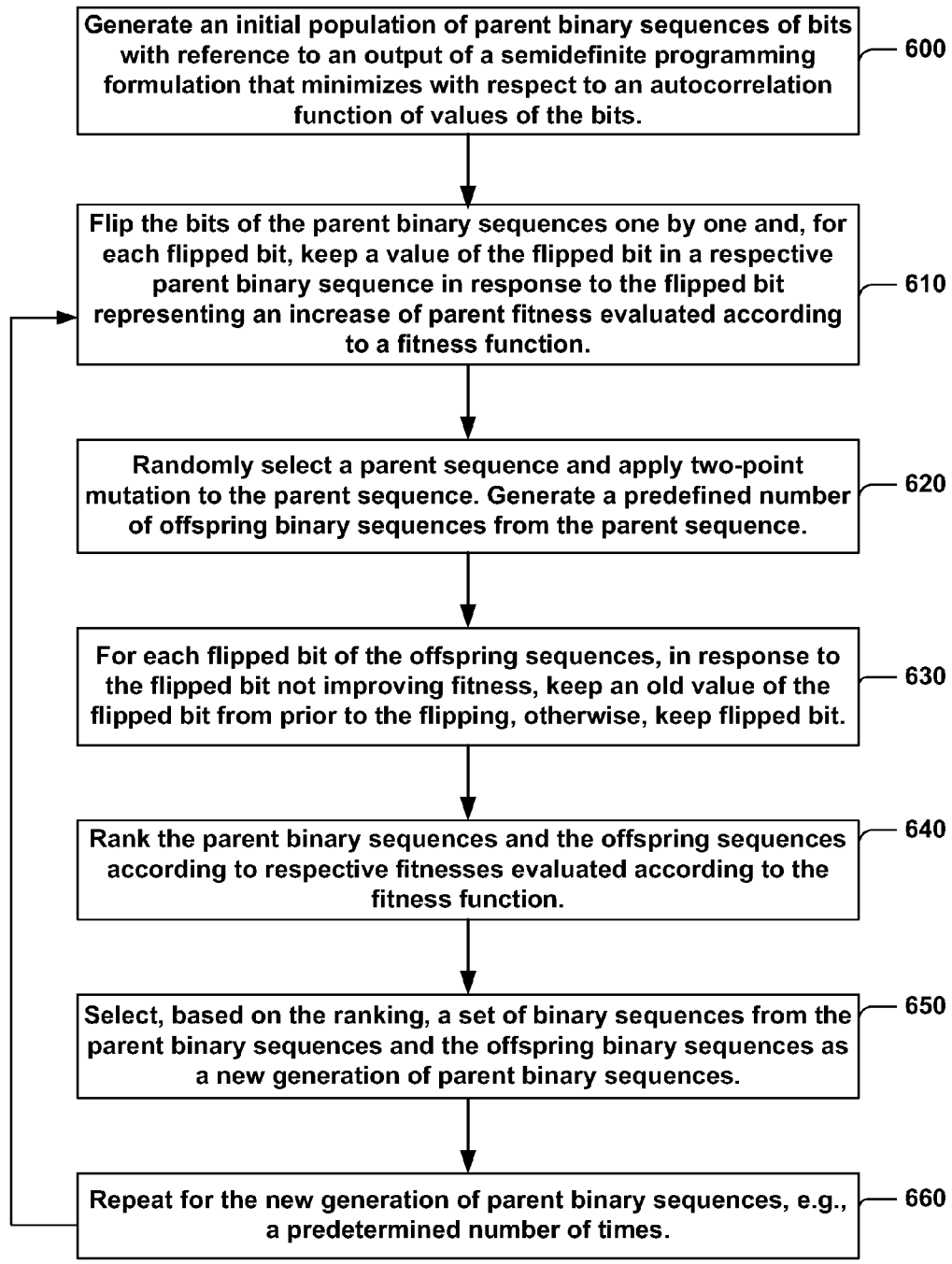
FIG. 6 is another example flow diagram representing a non-limiting embodiment in accordance with the subject disclosure.

FIG. 6 is an example flow diagram representing a non-limiting embodiment in accordance with the subject disclosure. At 600, an initial population of parent binary sequences of bits is generated with reference to an output of a semidefinite programming formulation that minimizes with respect to an autocorrelation function of values of the bits. At 610, the bits of the parent binary sequences are flipped one by one and, for each flipped bit, a value of the flipped bit in a respective parent binary sequence is kept in response to the flipped bit representing an increase of parent fitness evaluated according to a fitness function, such as any of the foregoing fitness functions presented herein. At 620, a parent sequence is randomly selected and two-point mutation is applied to the parent sequence. A predefined number of offspring binary sequences are generated from the parent sequence.

At 630, for each flipped bit of the offspring sequences, in response to the flipped bit not improving fitness, an old value of the flipped bit is kept from prior to the flipping, otherwise, the flipped bit is kept. At 640, the parent binary sequences and the offspring sequences are ranked according to respective fitnesses evaluated according to the fitness function. AT 650, based on the ranking, a set of binary sequences are generated from the parent binary sequences and the offspring binary sequences as a new generation of parent binary sequences. This can be repeated as shown at 660 for the new generation of parent binary sequences, e.g., a predetermined number of times, by returning to 610.

Figure 7:
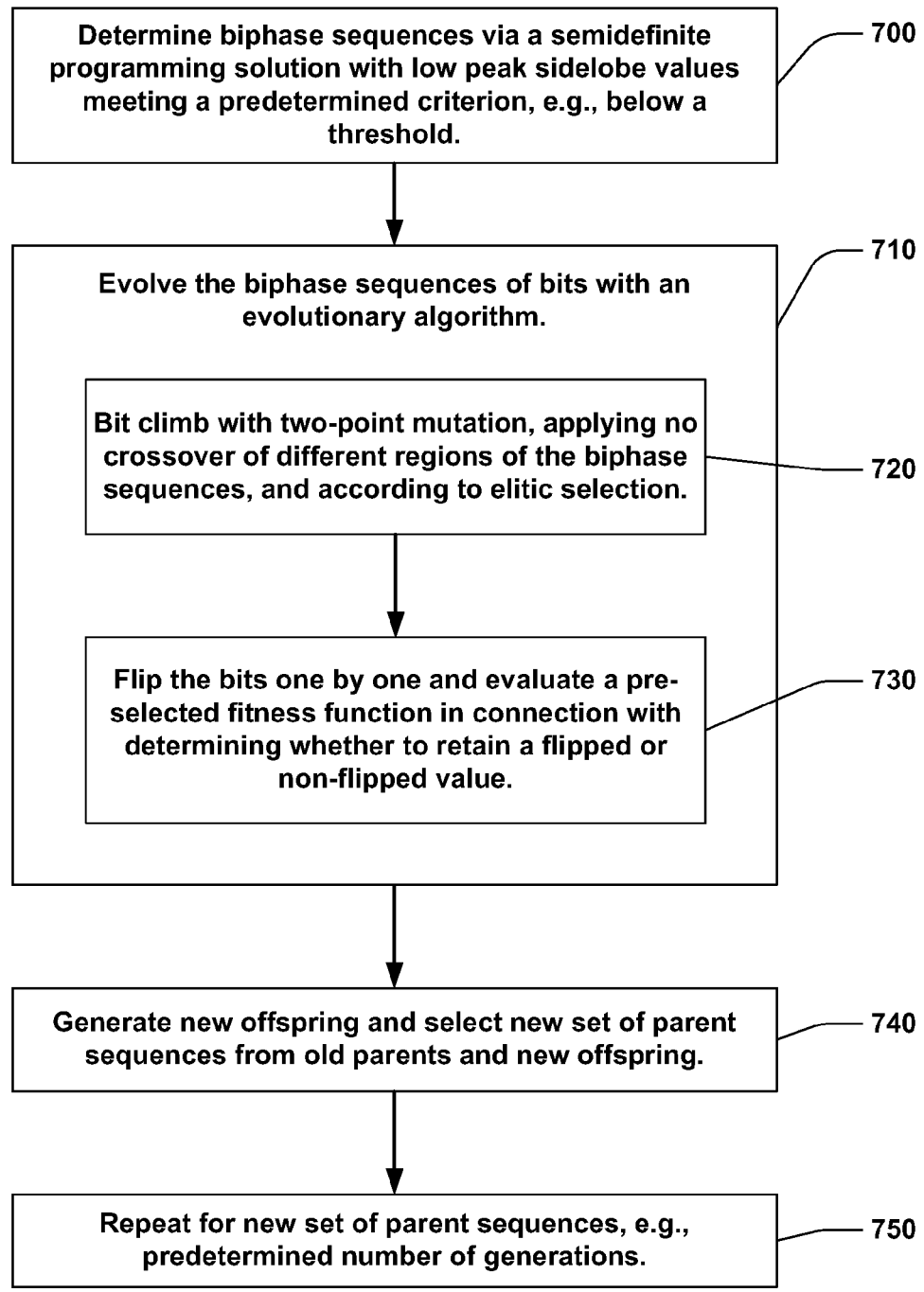
FIG. 7 is another example flow diagram representing a non-limiting embodiment in accordance with the subject disclosure.

FIG. 7 is another example flow diagram representing a non-limiting embodiment in accordance with the subject disclosure. At 700, biphase (e.g., binary) sequences are determined via a semidefinite programming solution with low peak sidelobe values meeting a predetermined criterion, e.g., below a threshold. At 710, the biphase sequences of bits are evolved with an evolutionary algorithm. At 720, a bit climb is performed with two-point mutation, applying no crossover of different regions of the biphase sequences, and according to elitic selection.

At 730, the bits are flipped one by one and a pre-selected fitness function is evaluated in connection with determining whether to retain a flipped or non-flipped value. At 740, new offspring are generated and a new set of parent sequences are selected from the old parents and new offspring. This can be repeated at 750 for the new set of parent sequences, e.g., predetermined number of generations.

Figure 8:
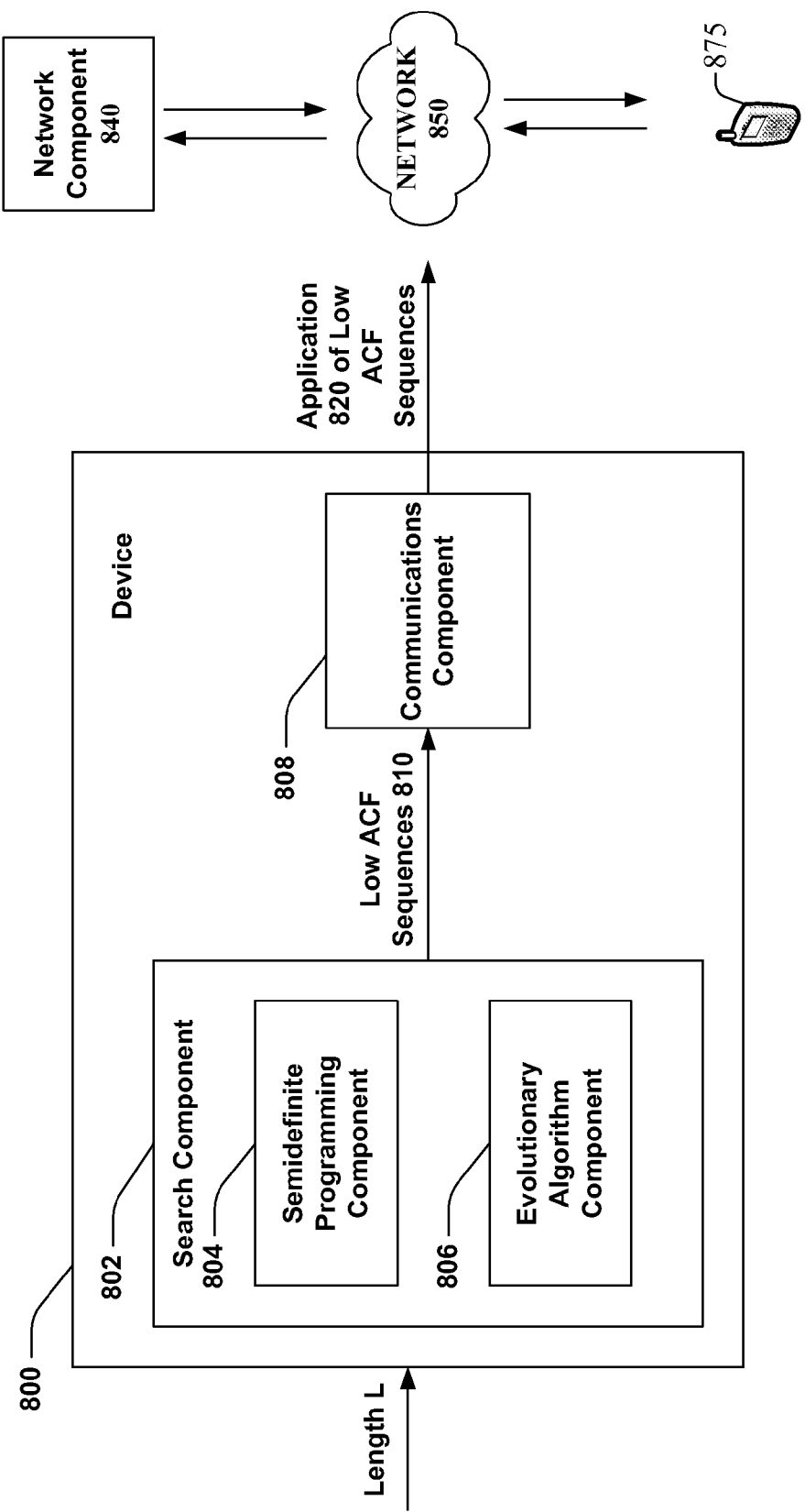
FIG. 8 is another example block diagram representing a non-limiting embodiment in accordance with the subject disclosure, and illustrating non-limiting application of the sequences generated.

FIG. 8 is an example block diagram representing a non-limiting embodiment in accordance with the subject disclosure. For general application 820 of low ACF sequences, a device 800 is instructed to build such low ACF sequence(s) 810 of length L. Device 800 can include a search component 802, including a semidefinite programming component 804 cooperating with an evolutionary algorithm component 806 to find appropriate low ACF sequence(s) 810 of length L.

In this regard, a communications component 808 can receive and communicate such low ACF sequence(s) 810 to an application 820 that can make use of such low ACF sequence(s) 810, which application 820 can be one associated with or applied by device 800. Application 820 can also be external to device 800, e.g., in the case of wireless usage of the low ACF sequence(s) 810 as described herein in one or more applications for long binary sequences having low ACF. In either case, communications component 808 communicates the low ACF sequence(s) 810 for further use. For one non-limiting example, as described earlier, low ACF sequence(s) 810 of long length L find application in today's wireless communications between network component(s) 840 and user equipment 875 via one or more network(s) 850, and as described in more detail below.

Figure 9:
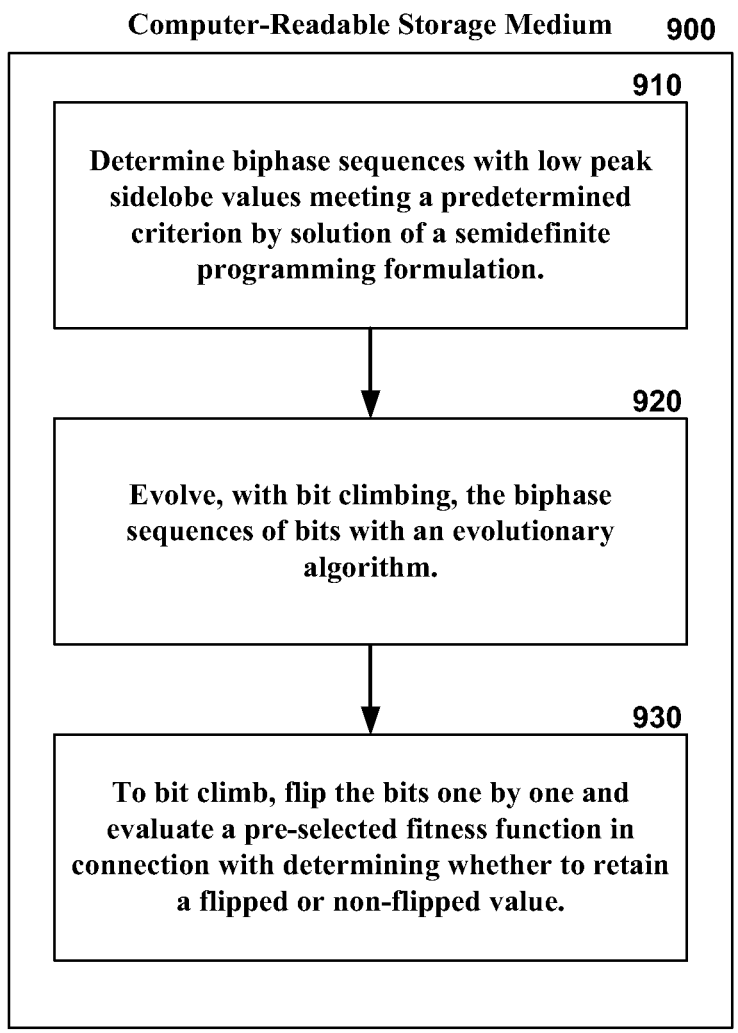
FIG. 9 is an example diagram representing a non-limiting embodiment in which a computer-readable storage medium stores computer executable instructions that, in response to execution, cause a computing system to perform operations of a process in accordance with the subject disclosure.

FIG. 9 is an example block diagram representing a non-limiting embodiment in which a computer-readable storage medium 900 stores computer executable instructions that, in response to execution, cause a computing system to perform operations in accordance with the subject disclosure.

In response to execution, at 900, biphase sequences are determined with low peak sidelobe values meeting one or more predetermined criteria as a function of a solution of a semidefinite programming formulation. In response to execution, at 910, the biphase sequences of bits are evolved with an evolutionary algorithm including bit climbing. At 920, the bit climbing is illustrated to include flipping the bits one by one and evaluating a pre-selected fitness function in connection with determining whether to retain a flipped or non-flipped value.

In this regard, sequences with low autocorrelation function have applicability and can be adapted to many fields. The various embodiments herein examine the problem of sequence search by minimizing sidelobe levels of sequences in the aperiodic ACFs. However, searching for sequences with ideal properties is often results in becoming stuck in numerous local minima as well as many maxima and the patterns of these minima and maxima are varied for different sequences. In contrast, the techniques described herein enable searching sequences with good correlation sidelobe levels at meaningful areas without degradation to random search. The techniques include: introduction of dual-windowing in the construction of orthogonal sets of optimal sequences, and searching for low-autocorrelation binary sequences by evolutionary algorithm.

With respect to dual correlation windows in the searching process, results can be obtained that fully realize the advantage of attaining a highest degree of delay spreads in signal transmission. The window sizes of the sequences searched are maximized and the corresponding out-of-the-window peak sidelobe levels of the correlation functions are minimized. Moreover, as generalized Oppermann sequences can be applied to any unimodular complex sequence such that all sequences in the set have the same absolute aperiodic autocorrelation function, the techniques described herein can be further extended to construct sets of orthogonal sequences with the introduction of Oppermann transform wherein the amount of interference experienced at each receiver due to other users is minimized. With the beneficial properties of the constructed orthogonal sets, zero in-phase multiple access interference can be ensured by their mutual orthogonality while the resistance towards receiver synchronization error can be enhanced by the dual-windowing property.

Moreover, a semidefinite programming approach is taken that incorporates an evolutionary algorithm to solve the search problem for low-autocorrelation binary sequences.

As to application, a rake receiver can be used to exploit the advantage of the above-described dual-window sequences by taking advantage of multipath diversity. A rake receiver is a radio receiver designed to counter the effects of multipath fading by using several sub-receivers called fingers, that is, several correlators each assigned to a different multipath component, which each independently decode a single multipath component. Another possible area for application is in Synchronous DS-CDMA (S-CDMA) systems, in which the techniques on multipath fading channels have attracted considerable and extensive interest due to its capability of increasing the system capacity by reducing the multiple-access interference. S-CDMA based on dual-window sequences is a promising technique to realize an orthogonal transmission system (like frequency division multiplex access (FDMA) or time division multiplex access (TDMA)) and it allows robust and continuous tracking of the reference clock and carrier, permitting coherent demodulation.

The various embodiments herein can also be extended with the use of advanced multi-user detectors to provide better performance compared with some common multi-user detection techniques adopted in an actual environment such as successive interference cancelation (SIC), parallel interference cancelation (PIC) and decorrelating detection.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
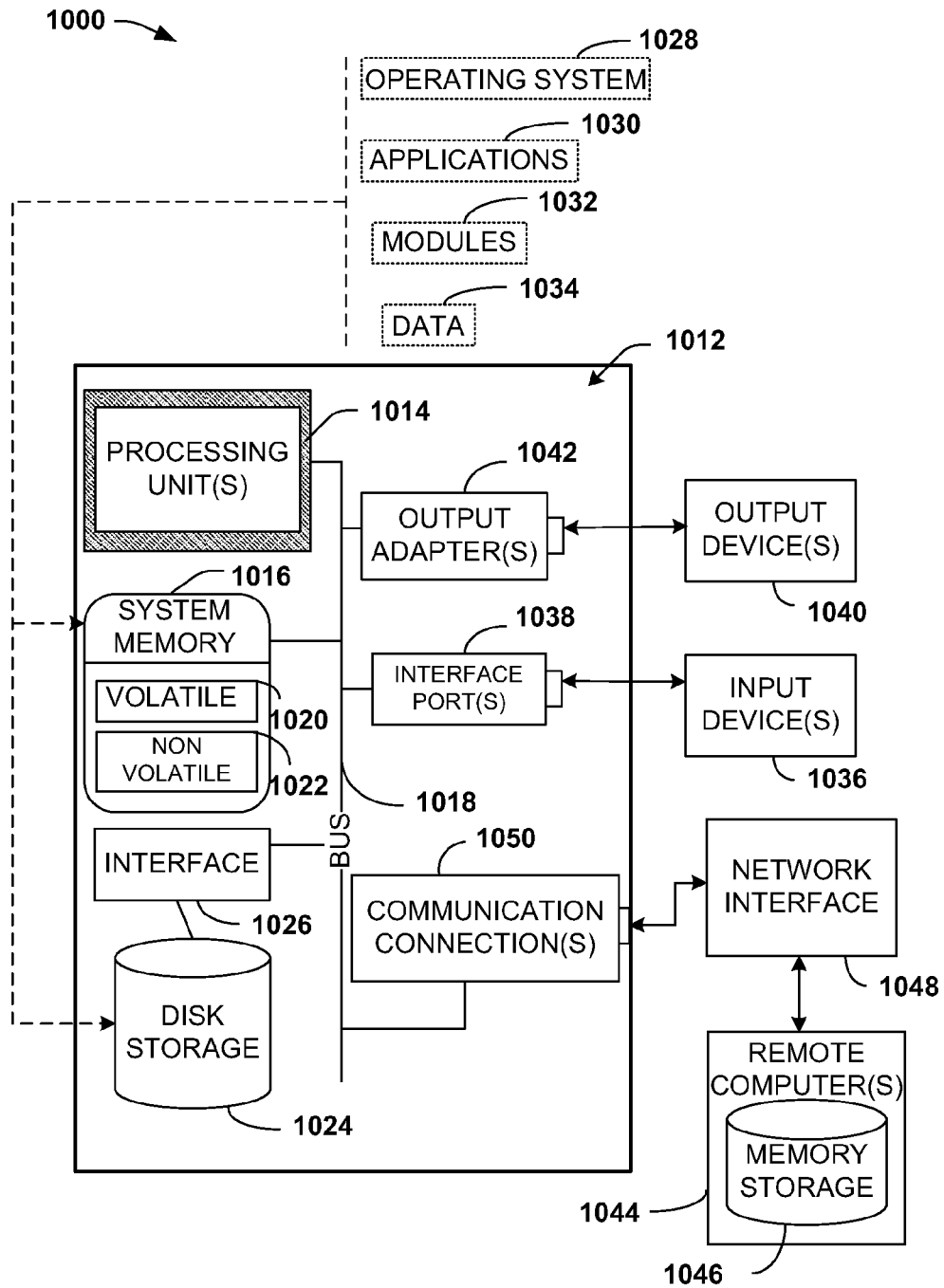
FIG. 10 illustrates a block diagram of a computing system operable to execute one or more of the various embodiments of the subject disclosure.

In order to provide a context for the various aspects of the disclosed subject matter, FIG. 10, and the following discussion, are intended to provide a brief, general description of a suitable environment in which the various aspects of the disclosed subject matter can be implemented, e.g., various processes associated with FIGS. 1-9. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1012 includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 includes volatile memory 1020 and nonvolatile memory 1022. A basic input/output system (BIOS), containing routines to transfer information between elements within computer 1012, such as during start-up, can be stored in nonvolatile memory 1022.

Computer 1012 can also include removable/non-removable, volatile/non-volatile computer storage media, networked attached storage (NAS), e.g., SAN storage, etc. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1014 through system bus 1018 via interface port(s) 1038. Interface port(s) 1038 include, for example, a serial port, a parallel port, a game port, and a universal serial bus (USB). Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

In the foregoing description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Some figure(s) illustrate or implicate methods in accordance with the disclosed subject matter. For simplicity of explanation, the methods are depicted and described as a series of acts or operations. It is to be understood and appreciated that the subject application is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

It is to be noted that aspects, features, or advantages of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced, may benefit from communications based on long binary sequences with low ACF. Additionally, substantially all aspects of the disclosed subject matter as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   generating, by at least one computing device, an initial population of parent binary sequences of bits with reference to an output of a semidefinite programming formulation that minimizes with respect to an autocorrelation function of values of the bits;
   flipping the bits of the parent binary sequences one by one and, for each flipped bit, keeping a value of the flipped bit in a respective parent binary sequence of the parent binary sequences in response to the flipped bit representing an increase of parent fitness evaluated according to a fitness function; and
   randomly selecting a parent sequence of the parent binary sequences and applying two-point mutation to the parent sequence including generating a predefined number of offspring binary sequences from the parent sequence.

2. The method of claim 1, wherein the flipping includes performing a partial restart of the flipping for a fixed number of generations.

3. The method of claim 2, wherein the performing the partial restart of the flipping is performed in response to detection of premature convergence of a parent binary sequence.

4. The method of claim 1, further comprising:
   for each flipped bit of the parent binary sequences, in response to the flipped bit not representing an increase of the fitness evaluated according to the fitness function, keeping an old value of the flipped bit from prior to the flipping.

5. The method of claim 1, further comprising:
   flipping the bits of the offspring binary sequences one by one and, for each flipped bit, keeping a value of the flipped bit in a respective offspring binary sequence of the offspring binary sequences in response to the flipped bit representing an increase of offspring fitness evaluated according to the fitness function.

6. The method of claim 5, wherein the flipping includes performing a partial restart of the flipping for a fixed number of generations.

7. The method of claim 6, wherein the performing the partial restart of the flipping is performed in response to detection of premature convergence of a parent binary sequence.

8. The method of claim 5, further comprising:
   for each flipped bit of the offspring binary sequences, in response to the flipped bit not representing an increase of the fitness evaluated according to the fitness function, keeping an old value of the flipped bit from prior to the flipping.

9. The method of claim 5, further comprising:
   ranking the parent binary sequences and the offspring binary sequences according to respective fitnesses evaluated according to the fitness function.

10. The method of claim 9, further comprising:
    based on the ranking, selecting a set of binary sequences from the parent binary sequences and the offspring binary sequences as a new generation of parent binary sequences.

11. The method of claim 10, further comprising:
    repeating the flipping the bits of the parent binary sequences, the randomly selecting the parent sequence, the flipping the bits of the offspring binary sequences, the ranking and the selecting of a new set of binary sequences for the new generation of parent binary sequences.

12. The method of claim 11, wherein the repeating includes performing the repeating a predetermined number of times.

13. The method of claim 1, further comprising:
    extending the method to quadriphase sequences represented as a function of binary sequences.

14. The method of claim 1, wherein the semidefinite programming formulation applies dual windowing with respect to the autocorrelation function of values of the bits.

15. The method of claim 1, further comprising:
    evaluating whether the flipped bit represents the increase of parent fitness according to the fitness function.

16. The method of claim 15, wherein the evaluating includes evaluating whether the flipped bit represents an increase in an objective function that is proportional to squares of sidelobe levels of respective parent binary sequences.

17. The method of claim 15, wherein the evaluating includes evaluating whether the flipped bit represents an increase in an objective function proportional to a ratio of a square of a length of a respective parent binary sequence divided by an energy of the respective parent binary sequence over a peak sidelobe level determined for the respective parent binary sequence.

18. A system, comprising:
    a sequence search component configured to find bi-phase sequences of bits having autocorrelation function of values of the bits that meet a predetermined condition of low autocorrelation, and in connection with search for the bi-phase sequences, the sequence search component is configured to:
      generate an initial population of parent bi-phase sequences of bits with reference to an optimal solution of a semidefinite programming equation applied to the bi-phase sequences;
      flip the bits of the parent bi-phase sequences one by one and, for each flipped bit, keep a value of the flipped bit in a respective parent bi-phase sequence of the parent bi-phase sequences in response to the flipped bit representing an increase of parent fitness evaluated according to a fitness function; and
      randomly select a parent sequence of the parent bi-phase sequences and apply two-point mutation to the parent sequence including generation of a predefined number of offspring bi-phase sequences from the parent sequence; and
    a communications component configured to communicate as a function of a bi-phase sequence of the bi-phase sequences found by the sequence search component.

19. The system of claim 18, wherein the sequence search component is further configured to perform a partial restart of the flip of the bits for a fixed number of generations.

20. The system of claim 19, wherein the sequence search component is further configured to perform the partial restart of the flipping in response to detection of premature convergence of a parent bi-phase sequence.

21. The system of claim 18, wherein the sequence search component is further configured to, for each flipped bit of the parent bi-phase sequences, in response to the flipped bit not representing an increase of the fitness evaluated according to the fitness function, maintain an old value of the flipped bit from prior to the flipping.

22. The system of claim 18, wherein the sequence search component is further configured to flip the bits of the offspring bi-phase sequences one by one and, for each flipped bit, maintain a value of the flipped bit in a respective offspring bi-phase sequence of the offspring bi-phase sequences in response to the flipped bit representing an increase of offspring fitness evaluated according to the fitness function.

23. The system of claim 22, wherein the sequence search component is further configured to perform a partial restart of the flip of the bits of the offspring bi-phase sequences for a fixed number of generations.

24. The system of claim 23, wherein the sequence search component is further configured to perform the partial restart of the flipping in response to detection of premature convergence of a parent bi-phase sequence.

25. The system of claim 22, wherein the sequence search component is further configured to, for each flipped bit of the offspring bi-phase sequences, in response to the flipped bit not representing an increase of the fitness evaluated according to the fitness function, maintain an old value of the flipped bit from prior to the flip of the bits.

26. The system of claim 22, wherein the sequence search component is further configured to generate rankings of the parent bi-phase sequences and the offspring bi-phase sequences according to respective fitnesses evaluated according to the fitness function.

27. The system of claim 26, wherein the sequence search component is further configured to, based on the rankings, select a set of bi-phase sequences from the parent bi-phase sequences and the offspring bi-phase sequences as a new generation of parent bi-phase sequences.

28. The system of claim 27, wherein the sequence search component is further configured to repeat the flip of the bits of the parent bi-phase sequences, the random selection of the parent sequence, the flip of the bits of the offspring bi-phase sequences, the generation of rankings and the selection of the new set of bi-phase sequences for the new generation of parent bi-phase sequences.

29. The system of claim 28, wherein the sequence search component is further configured to repeat a predetermined number of times.

30. The system of claim 18, wherein the sequence search component is further configured to find quadriphase sequences having autocorrelation function of values of the bits that meet the predetermined condition.

31. The system of claim 18, wherein the semidefinite programming equation applies dual windows with respect to the autocorrelation function of values of the bits.

32. The system of claim 18, wherein the sequence search component is further configured to evaluate whether the flipped bit represents the increase of parent fitness according to the fitness function.

33. The system of claim 32, wherein the sequence search component is further configured to evaluating includes evaluating whether the flipped bit represents an increase in an objective function that is proportional to squares of sidelobe levels of respective parent bi-phase sequences.

34. The system of claim 32, wherein the sequence search component is further configured to evaluate whether the flipped bit represents an increase in an objective function proportional to a ratio of a square of a length of a respective parent bi-phase sequence divided by an energy of the respective parent bi-phase sequence over a peak sidelobe level determined for the respective parent bi-phase sequence.

35. A computer-readable storage medium storing computer executable instructions that, in response to execution, cause a computing system to perform operations, comprising:
   determining biphase sequences with low peak sidelobe values meeting at least one predetermined criterion including solving a semidefinite programming formulation; and
   evolving the biphase sequences of bits with an evolutionary algorithm including bit climbing,
   wherein the bit climbing includes flipping the bits one by one and evaluating a pre-selected fitness function in connection with determining whether to retain a flipped or non-flipped value.

36. The computer-readable storage medium of claim 35, wherein the evolving includes evolving the biphase sequences with an evolutionary algorithm applying no crossover of different regions of the biphase sequences.

37. The computer-readable storage medium of claim 35, wherein the evolving includes evolving the biphase sequences according to an elitic selection.

38. The computer-readable storage medium of claim 35, wherein the evolving includes evolving the biphase sequences according to a two-point mutation operation applied to the bits.

39. The computer-readable storage medium of claim 35, wherein the evolving includes evolving within a range.

40. The computer-readable storage medium of claim 35, wherein the bit climbing is applied as a local search.

41. The computer-readable storage medium of claim 35, wherein the evolving includes evolving within a range.

42. A wireless communications apparatus, comprising:
   means for searching for biphase sequences with low peak sidelobe values meeting a predetermined criterion including means for optimizing a semidefinite programming equation and means for applying an evolutionary algorithm to bits of the biphase sequences; and
   means for communicating based on a binary sequence output from the means for searching.

* * * * *